US012776047B2

(12) United States Patent
Singh et al.

(10) Patent No.: US 12,776,047 B2
(45) Date of Patent: Oct. 27, 2026

(54) VIDEO OBJECT SEGMENTATION USING ESTIMATED MOTION INFORMATION AND IMAGE FEATURES

(71) Applicant: Adobe Inc., San Jose, CA (US)

(72) Inventors: Silky Singh, San Jose, CA (US); Shirpad Deshmukh, San Jose, CA (US); Rishabh Jain, San Jose, CA (US); Mayur Hemani, Noida (IN); Mausoom Sarkar, Noida (IN); Balaji Krishnamurthy, San Jose, CA (US)

(73) Assignee: Adobe Inc., San Jose, CA (US)

( * ) Notice: Subject to any disclaimer, the term of this patent is extended or adjusted under 35 U.S.C. 154(b) by 472 days.

(21) Appl. No.: 18/232,131

(22) Filed: Aug. 9, 2023

(65) Prior Publication Data

US 2025/0054164 A1 Feb. 13, 2025

(51) Int. Cl.

| | |
|---|---|
| ***G06T 7/215*** | (2017.01) |
| ***G06T 7/162*** | (2017.01) |
| ***G06T 7/194*** | (2017.01) |
| ***G06T 7/246*** | (2017.01) |

(52) U.S. Cl.

CPC .............. *G06T 7/215* (2017.01); *G06T 7/162* (2017.01); *G06T 7/194* (2017.01); *G06T 7/248* (2017.01); *G06T 2207/10016* (2013.01); *G06T 2207/20072* (2013.01); *G06T 2207/20081* (2013.01)

(58) Field of Classification Search

CPC ......... G06T 7/215; G06T 7/162; G06T 7/194; G06T 7/248; G06T 2207/10016; G06T 2207/20072; G06T 2207/20081; G06T 7/11; G06T 2207/20084

See application file for complete search history.

(56) References Cited

U.S. PATENT DOCUMENTS

2016/0379055 A1* 12/2016 Loui .................. G06F 18/2323 382/103
2022/0101539 A1* 3/2022 Lin ........................ G01P 13/00

OTHER PUBLICATIONS

Wang, Yangtao, et al. "TokenCut: Segmenting Objects in Images and Videos with Self-supervised Transformer and Normalized Cut." arXiv preprint arXiv:2209.00383 (2022). (Year: 2022).*
Choudhury, Subhabrata , et al., "Guess What Moves: Unsupervised Video and Image Segmentation by Anticipating Motion", Visual Geometry Group University of Oxford, UK, 2022, pp. 1-30, https://www.robots.ox.ac.uk/~vgg/research/gwm.

(Continued)

*Primary Examiner* — Gregory A Morse
*Assistant Examiner* — Renae A Bitor
(74) *Attorney, Agent, or Firm* — Shook, Hardy & Bacon L.L.P.

(57) ABSTRACT

Various disclosed embodiments are directed to learning-free video object segmentation (VOS) of one or more video frames. In various instances, such VOS does not rely on human supervision or labeling and can be generalized or applied to any video "in the wild." This is because training and fine-tuning are not required for VOS. Particular embodiments perform VOS based on feature similarity of different sections of a video frame and/or estimated motion similarity of different sections of the video frame, such as via a graph cut on a graph.

19 Claims, 9 Drawing Sheets

(56) References Cited

OTHER PUBLICATIONS

Yang, Yanchao et al., "Dystab: Unsupervised Object Segmentation Via Dynamic-Static Bootstrapping, Stanford University, In Proceedings of the IEEE/CVF Conference on Computer Vision and Pattern Recognition", 2021, pp. 1-13, https://github.com/glai88/unsupervised_segmentation.
Ye, Vickie et al., "Deformable Sprites for Unsupervised Video Decomposition, University of California, Berkley, In Proceedings of the IEEE/CVF Conference on Computer Vision and Pattern Recognition", 2022, pp. 1-10.
Xie, Junyu , et al., Segmenting Moving Objects Via an Object-Centric Layered Representation, University of Oxford, UK, 36th Conference on Neural Information Processing Systems (NerIPS 2022), pp. 1-29, https://www.robots.ox.ac.uk/~vgg/research/oclr/.
Ponimatkin, Georgy et al., "A Simple And Powerful Global Optimization For Unsupervised Video Object Segmentation", LIGM, Ecole des Ponts, University Gustave Eiffel, CNRS, Marne-la-Vallee, France, In Proceedings of the IEEE/CVF Winter Conference on Applications of Computer Vision, 2023, pp. 1-28, https://ponimatkin/github.io/ssl-vos.
Singh, Deshmkh, et al., "Video Object Segmentation Through Flow-Guided Graph-Cut", Media and Data Science Research, pp. 1-13.

* cited by examiner

VIDEO OBJECT SEGMENTATION USING ESTIMATED MOTION INFORMATION AND IMAGE FEATURES

BACKGROUND

Various technologies employ functionality for rendering or editing video. For example, some technologies perform video object segmentation (VOS). VOS is the process of partitioning or separating out one or more objects throughout a video sequence. For example, VOS can be used to detect and track, via the generation of a pixel mask, each pixel representing moving objects in a video. VOS has many applications, such as autonomous driving, augmented reality, video editing, video summarization, and the like. However, the segmentation of objects in a video is challenging due to motion nuances, such as motion blurring, parallax (the observed displacement of an object caused by a change of the observer's point of view), occlusions (an object hiding a portion of another object), changes in illumination, and the like.

SUMMARY

One or more embodiments are directed to performing learning-free video object segmentation (VOS) of one or more video frames. In various instances, such VOS does not rely on human supervision or labeling and can be generalized or applied to any video "in the wild." This is because training and fine-tuning are not required for VOS. Particular embodiments perform VOS based on feature similarity of different sections of a video frame and/or estimated motion (e.g., optical flow) similarity of different sections of the video frame. For example, particular embodiments can derive the predicted displacement of each pixel in X and Y directions from the video frame to another frame for estimated motion information via optical flow maps. In other words, particular embodiments implement a VOS pipeline that incorporates intra-frame appearance and/or motion estimation (e.g., flow) similarities.

Particular embodiments can derive a graph data structure that includes various nodes and edges, where each node represents a respective section of the video frame and each edge is associated with a weight that indicates a measure of feature similarity (e.g., via cosine similarity) between respective sections of the video frame and/or a indicates a measure of estimated motion similarity between the respective sections of the video frame. Particular embodiments then group, by performing a graph cut on the graph data structure, one or more nodes together based on the measure of similarity exceeding a threshold. In this way, particular embodiments can perform video object segmentation by, for example, partitioning the foreground and the background in the video frame according to the graph cut. In other words, particular embodiments guide VOS outputs using a flow-guided graph cut.

Particular embodiments have the technical effects of improved deployment and efficiency costs, improved hardware and computational consumption, reduced computer input/output (I/O), improved accuracy (e.g., a high mean intersection-over-union (mIoU) score) and generalizability, reduced network latency, and reduced memory consumption, as described in more detail below.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Overview

Figure 1:
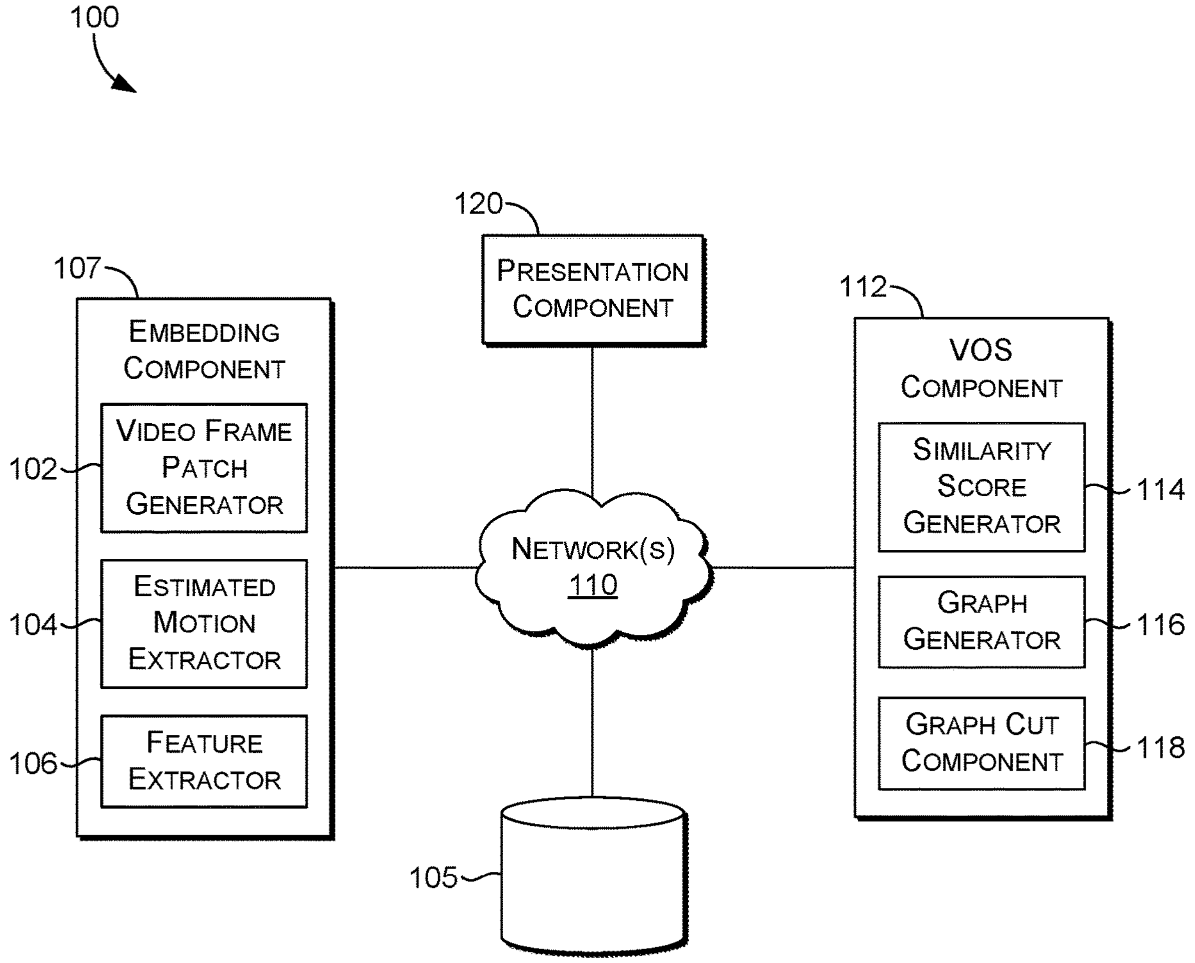
FIG. 1 is a block diagram of a computing system architecture in which aspects of the present disclosure are employed, according to some embodiments.

Existing video object segmentation (VOS) and similar technologies have many technical problems. For example, most of these technologies employ machine learning models that require training, fine-tuning, and testing to detect and track objects in a video. With respect to training and fine-tuning, one problem is that these technologies are supervised and require extensive manual input of human annotators to label each object of each video frame of an entire video sequence. Such functionality is not only tedious for users and developers, but it significantly impacts deployment and efficiency costs because of the extended time needed for correctly labeling each object of each frame and training the model. These models take a vast amount of time to train, fine-tune, test, and eventually deploy in a production environment. This is mainly because most parameters are learned from scratch, taking many epochs and training sessions.

Additionally, using machine learning models for VOS causes hardware (e.g., memory, I/O) and computational (e.g., network latency) costs. These models typically have to be trained and/or fine-tuned on millions of video frames, where billions of parameters (e.g., weights, coefficients) and hyperparameters (e.g., choice of loss function and number of hidden layers) must be implemented to initiate or complete training and fine-tuning. This raises several concerns. First is the cost of exponentially scaling these models' requirements. Second, these models require a very large computer memory footprint. This is because these model parameters and hyperparameters, training image frames, operator functions (e.g., neural network node loss functions, activation functions, matrix multiplication), tensors, and the like must be stored, which consumes an excessive amount of memory.

Moreover, computer input/output (I/O) is unnecessarily increased because the training images and operator functions must be accessed from storage at runtime, training, fine-tuning, and testing to make predictions. Accordingly, this requires storage components (e.g., a read/write head) to repeatedly reach out to storage devices (e.g., disk), which consequently places unnecessary wear on the storage components. For example, each neural network node typically uses multiple input/output tensors, which are input feature representation data structures stored in memory. Accordingly, each time an input video frame passes through each neuron and each layer of a neural network, I/O is unnecessarily increased because the tensors are accessed from memory so that the neurons can perform operations (e.g., matrix multiplication) on them and there are many neurons. Accordingly, excessive wear is placed on storage components, which must access the tensors for every operation, thereby causing excessive wear and tear on a read/write head via repetitive I/O. Similarly, network latency is increased because of the delayed response time needed to make inference predictions. For example, in response to issuing a user request to track an object, a frame may be fed to an input layer of several nodes. Each node, having multiple input/output tensors, then process the input (e.g., via matrix multiplication or dropout function), and then pass their output tensor to the next node, which continues until every node in the machine learning model processes the data, which increases network latency.

Another technical problem is that existing technologies are not generalizable, leading to model overfitting issues. The goal of VOS processing is to design a model that can learn general and predictive knowledge from training data, and then apply the model to new data (e.g., new test video frames) across different domains and video nuances (e.g., motion blurring, parallax, occlusion, changes in illumination), which is referred to as "generalization." VOS Generalization deals with a challenging setting where one or several different but related domains or video nuances are given, and the goal is to learn a model that can generalize to an unseen test or deployment domains (e.g., domain shift) or video nuances. In other words, for example, the model should be able to classify and track a dog in an image, regardless of whether the dog suddenly changes positions (changing the point of view of the camera), blurs, changes reflectance properties, becomes occluded, or the like. Some existing computer vision technologies and models try to overcome the generalization problem in image processing by augmenting a training data set with more video images that account for more domains or video nuances. However, this leads to overfitting (and excessive memory consumption). Overfitting is an undesirable machine learning behavior that occurs when the machine learning model gives accurate predictions for training data but not for new data. In an illustrative example, overfitting can occur because a model may be trained only on different positions of a dog all at the same resolution with no blurry images of dogs. However, a testing or deployment input may be a blurred image of a dog at a particular video frame, which causes the model to make an inaccurate prediction based learning only different dog positions at the same high resolution. Existing technologies have trouble detecting and tracking objects for domains or video nuances it has not trained on.

Another technical problem is that existing technologies use many post-processing techniques, which account for 80-90% of processing time, thereby increasing network latency. For example, after a machine learning model is used to make a video segmentation prediction, some existing technologies perform multi-step flow, multi-crop, and/or temporal smoothing to improve or refine the model video segmentation prediction. These steps and other post-processing techniques account for a significant cost in network latency.

Embodiments of the present invention provide one or more technical solutions to one or more of these technical problems, as described herein. Various aspects are directed to performing learning-free video object segmentation of one or more video frames. Such video object segmentation does not rely on human supervision and can be generalized or applied to any video "in the wild." This is because training and fine-tuning are not required for VOS. Specifically, particular embodiments perform VOS based on feature similarity of different sections of the video frame and/or estimated motion similarity of different sections of the video frame.

In operation, some embodiments first receive a video frame (e.g., a video image of an entire video sequence) and estimated motion information (e.g., optical flow RGB) for various pixels of the video frame. For example, particular embodiments can derive the predicted displacement of each pixel in X and Y directions from the video frame to another frame via an AR flow model.

Particular embodiments can then derive a graph data structure that includes various nodes and edges, where each node represents a respective section of the video frame and each edge is associated with a weight that indicates a measure of feature similarity (e.g., cosine similarity) between respective sections of the video frame and/or a indicates a measure of estimated motion similarity between the respective sections of the video frame. Particular embodiments then group, by performing a graph cut on the graph, one or more nodes together based on the measure of similarity exceeding a threshold. In this way, particular embodiments can perform video object segmentation by, for example, partitioning the foreground and the background in the video frame according to the graph cut.

Particular embodiments have the technical effect of improved deployment and efficiency costs. This is because particular embodiments do not need to directly train, fine-tune-, and/or test models before deployment. Accordingly, with respect to training and fine-tuning, there is no need for supervision and any manual input of human annotators to label each object of each video frame of an entire video sequence. In other words, one technical solution is that the VOS pipeline (e.g., the deriving of estimation information, the generating of similarity scores, the generation of a graph data structure, and/or the performing of the video object segmentation) is a part of an unsupervised end-to-end pipeline that excludes learning or training a machine learning model for VOS. Another technical solution is the use of a pre trained vision transformer (e.g., a DINO encoder) to derive one or more embeddings, where no additional training is needed since the model has been pretrained. Consequently, such functionality is not as tedious for users and developers.

Further, it improves deployment and efficiency costs because there is no need for correctly labeling each object of each frame and training the model.

Some embodiments also have technical effect of improved hardware and computational consumption. This is at least partially because of the technical solution described above—the VOS pipeline being part of an unsupervised end-to-end pipeline that excludes learning or training a machine learning model. Accordingly, various embodiments do not employ a model that has to be trained and/or fine-tuned on millions of video frames, where billions of parameters and hyperparameters must be implemented to initiate or complete training and fine-tuning. Accordingly, the cost of exponentially scaling these models' requirements is not as high as existing solutions. Further, particular embodiments do not require as large of a computer memory footprint. This is because these embodiments do not have to train machine learning models for performing VOS or store model training components, such as model parameters and hyperparameters, training image frames, operator functions, tensors, and the like, which frees up and reduces memory consumption.

Moreover, in various embodiments computer input/output (I/O) is reduced because there is no machine learning models needing to be accessed in storage for performing VOS, or no training images and operator functions that must be accessed from storage at runtime, training, fine-tuning, and testing to make predictions. Accordingly, this requires storage components to reach out to storage devices (e.g., disk) fewer times, which consequently reduces wear on the storage components. For example, since performing segmentation does not require machine learning, an input video frame need not pass through each neuron and each layer of a neural network. Therefore, I/O is reduced because no tensors are accessed from memory and no neurons need to perform operations. Accordingly, there is less wear is placed on a read/write head because there is less I/O. Similarly, network latency is reduced because of the reduced response time needed to make inference predictions. For example, in response to issuing a user request to track an object, instead of feeding a video frame to an input layer of several neural network nodes and processing the input (e.g., via matrix multiplication or dropout function) until every node in the machine learning model processes the data, particular embodiments employ the technical solutions of a data structure (e.g., a graph) or similarity score to perform VOS. Each node in the data structure represents a respective section of a video frame and each edge is associated with a weight that indicates a measure of similarity between respective sections of the video according to estimation information and/or feature similarity. Using the similarity scores and/or the data structure alone reduces network latency because no machine learning model is needed for this functionality.

Another technical solution is that particular embodiments are more accurate and more generalizable relative to existing technologies, thereby eliminating (or reducing) the likelihood of model overfitting. The "Experimental Results" section below quantitatively illustrates one example of improved accuracy in detail as it relates to higher intersection-over-union (mIoU) scores relative to existing technologies. Instead of augmenting a training data set with more video images that account for more domains or video nuances like existing technologies do, particular embodiments do not train or augment any data sets. One technical solution is the use of estimated motion information and/or image feature similarity for VOS. The use of estimated motion information alone, for example, should generalize across most video nuances, such as motion blurring, parallax, occlusions, changes in illumination, and the like. This is because regardless of how dissimilar an object appears from video frame to video frame (e.g., because it suddenly blurs or becomes occluded), the motion information should be constant or similar between individual video frames and so the object should be able to be tracked easier. In some cases, however, objects do suddenly stop, change directions, or otherwise make a sudden change in motion information. In these cases, image feature similarity can additionally assist or be used in VOS for tracking an object. For example, even though an object representing a car was accelerating in one video frame but stopped in another video frame (indicating dissimilar motion information), because the visual image features between the image frames representing the car remained constant, the object can still be tracked based mainly on the features remaining similar. Thus, in some embodiments, the combination of estimated motion information and image feature similarity makes VOS more accurate or more generalizable.

Another technical effect is reduced network latency via the avoidance of one or more post-processing functions. As described herein, existing technologies use many post-processing techniques, which account for 80-90% of processing time, thereby increasing network latency. However, in certain embodiments, after VOS is performed, no (or fewer) post-processing techniques are performed. For example, after a machine learning model is used to make a video segmentation prediction, there is no functionality, such as multi-step flow, multi-crop, or temporal smoothing to refine the model video segmentation prediction. Thus one technical solution is the performing of video object segmentation of a video frame based on the generating of one or more similarity scores and/or the generation of a data structure that indicate such similarity scores. These steps account for a significantly lower cost in network latency.

In some embodiments, another technical solution is performing a graph cut on a graph data structure to group one or more nodes of the graph together based on a measure of similarity between nodes (and thus patches of a video frame) exceeding a threshold. This not only mitigates the need for any post-processing techniques and thus reduces network latency, but graph cutting is an alternative approach for VOS relative to machine learning-model based solutions which (as described above) require fine-tuning, manual labelling, and supervision. Therefore, memory consumption and I/O is reduced, all while maintaining VOS accuracy and generalization.

Exemplary System

Referring now to FIG. 1, a block diagram is provided showing aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 800 of FIG. 8). Alternatively, some or each of the components may be distributed among various computing devices, such as in a distributed cloud computing environment. In some embodiments, the system 100 and each of the components are located within the server and/or user device of FIG. 7, as described in more detail herein.

The system 100 includes network 110, which is described in connection to FIG. 7, and which communicatively couples components of system 100, including an embedding component 107, a Video Object Segmentation (VOS) component 112, presentation component 120, and storage 105. The components of the system 100 may be embodied as a set of compiled computer instructions or functions, program modules, computer software services, logic gates, hardware accelerators, or an arrangement of processes carried out on one or more computer systems. The system 100 generally operates to perform VOS based at least in part on estimated motion and feature similarity.

The embedding component 107 is generally responsible for encoding (or deriving an encoded representation of) one or more video frames into one or more embeddings that represent estimated motion information and/or feature extraction information associated with the one or more video frames. An "embedding" is typically a numerical representation (e.g., a vector) of real-world objects and relationships within the video frame. For example, an embedding can represent line and color features of a dog object in a video frame and the dog's velocity motion information. An embedding may be a relatively low-dimensional space into which embodiments can translate high-dimensional vectors. In some embodiments an embedding is a way of representing data as points in n-dimensional space so that similar data points can be clustered together, as described in more detail below.

In some embodiments, the embedding component 107 represents (or derives an embedding from) a modified version of any suitable pre-trained vision transformer (ViT). Such ViT is "modified" because one or more portions are inactivated or not used, such as fine-tuning with a classifier. For example, the modified ViT may split a video frame into patches (via the video frame patch generator 102), flatten the patches, generate lower-dimension linear embeddings from the flattened patches, and add the positional embeddings. A Transformer is a deep learning model that adopts a self-attention mechanism, differentially weighting the significance of each part of the input data—the video frame. In some embodiments, in ViT, each input video frame is treated as a sequence of patches where every patch is flattened into a single vector by concatenating the channels of all pixels in a patch and then linearly projecting it to the desired input dimension.

In some embodiments, the modified ViT include two blocks or major processing elements: Layer Norm and Multi-head Attention Network (MSP), but excludes or does not use Multi-Layer Perceptrons (MLP). Layer Norm keeps the training process on track and lets the model adapt to the variations among the training images. MSP is a network responsible for generating attention maps from the given embedded visual tokens. These attention maps help the network focus on the most critical regions in the image, such as object(s). MLP is a two-layer classification network with GELU (Gaussian Error Linear Unit) at the end. However, various embodiments do not employ or use MLP, since it represents ML model classification functionality and various embodiments of the pipeline described herein do not use image classification or any other machine learning model inference functionality.

In some embodiments, the attention mechanism used in the modified Transformer uses three variables: Q (Query), K (Key), and V (Value). Simply put, it calculates the attention weight of a Query token (token: an image region or set of pixels) and a Key token and multiplies the Value associated with each Key. In short, it calculates the association (attention weight) between the Query token and the Key token and multiplies the Value associated with each Key. Defining the Q, K, and V calculation as a single head, the multi-head attention mechanism is defined as follows. The (single-head) attention mechanism uses Q and K. Still, in the multi-head attention mechanism, each head has its projection matrix W_i^Q, W_i^K, and W_i^V, and particular embodiments calculate the attention weights using the feature values projected using these matrices. The intuition behind multi-head attention is that it allows embodiments to attend to different parts of the video frame and/or video frame sequence differently each time. This means that the model can better capture positional information because each head will attend to different input segments. The combination of them will give a more robust representation. Each head will also capture different contextual information by uniquely correlating image sections/portions.

The embedding component 107 includes the video frame patch generator 102, the estimated motion extractor 104, and the feature extractor 106. The video frame patch generator 102 is generally responsible for parsing each video frame into a plurality of sections (also referred to as "patches"). A "section" or "patch" typically includes two or more pixels and can include any suitable quantity and take on any suitable shape (e.g., a square, a rectangle, etc.). In some embodiments, however, a section or patch may only consist of a single pixel. A "video frame" as described herein refers to a single still image that, when played in sequence with the other video frames of the video, creates motion on a playback surface. Thus a video frame is a single image in a sequence of images that make up a video. In some embodiments, the video frame patch generator 102 subdivides a video frame into its constituent parts by dividing the video frame along rows and/or columns (e.g., via equal partitioning or unequal partitioning). In equal partitioning, for example, the rows and columns of the image are equally divided into non-overlapping sections to generate sub-images that represent different sections of an entire video frame. The video frame patch generator 102 typically splits an image frame up into smaller predefined sections (without respect to objects or other content features). For example, a video frame may contain a mountain scenery background with two cars in the foreground. The video frame patch generator 102 may equally split up the video frame into non-overlapping sections, where the first patch only contains the mountain scenery background (and not any of the cars), the second patch only contains a first car and half of the second car, and the third patch only contains the other half of the second car (but not the first car). In some embodiments, the video frame patch generator 102 divides a video frame by predetermined pixel counts, such as 4 pixels by 4 pixels, 16×16 or the like.

In some embodiments, the video frame patch generator 102 performs preprocessing of a video frame before dividing up video frames. For example, the video frame patch generator 102 can index the patches x with single integers {1, . . . , R} according to their location in the video frame. The video frame patch generator 102 can also vectorize the patches as vectors in RQ so embodiments can store them as columns of a matrix X∈R Q×R. Vectorization of an image patch means performing a linear transformation which converts the patch matrix P (where each value in the matrix represents a corresponding pixel value) into a column vector.

The estimated motion extractor 104 is generally responsible for deriving estimated motion information for one or more pixels (or other video content elements, such as voxels) in each video frame, of a sequence of video frames corresponding to a video sequence and/or one or more patches within a single video frame. For example, the estimated motion extractor 104 can be a program function that calls an optical flow model estimator that estimates the movement of pixels or features in a video frame. Optical flow is the task of predicting movement between two video frames, typically two consecutive video frames of a video. Optical flow models typically take two consecutive video frames (but can take any quantity of video frames) as input, and predict a flow for a next-in-line video frame: the flow indicates the predicted displacement of every single pixel in the input frame(s), and maps it to its corresponding pixel in a second output video frame(s). Flows are (2, H, W)-dimensional tensors (data structures, such as array), where the first axis corresponds to the predicted horizontal (X) and vertical (Y) displacements. In some embodiments, optical flow calculates a magnitude (e.g., velocity) for each point or pixel within a video frame (or from input video frame A and B), and/or provides an estimation of where the point or pixel should be in the next video frame (video frame C) (i.e., the displacement). The estimate motion extractor 104 is described in more detail below.

The next several paragraphs below describe embodiments of the estimated motion extractor 104 as it relates to optical flow. The estimated motion extractor 104 derives (or learns) optical flow from video frames without the need for ground truth. Given a dataset of image sequences $\mathcal{I}$, particular embodiments train a network f(·) to predict dense optical flow $U_{12}$ for two consecutive RGB video frames $\{I_1, I_2\} \in \mathcal{I}$.

$$U_{12} = f(I_1, I_2; \Theta), \tag{1}$$

where Θ is the set of learnable parameters in the network.

Despite the lack of direct supervision from ground truth, the network can be trained implicitly with view synthesis. Specifically, image $I_2$ can be warped to synthesize the view of $I_1$ with the prediction of optical flow $U_{12}$, $$\hat{I}_1(p) = I_2(p + U_{12}(p)), \tag{2}$$

where p denotes pixel coordinates in the image, and bilinear sampling is used for the continuous coordinates. Then, the objective of view synthesis, also known as photometric loss $\mathcal{L}_{ph}$, can be formulated as:

$$\mathcal{L}_{ph} \sim \sum_p \rho(\hat{I}(\Theta), I), \tag{3}$$

where ρ(·) is a pixel-wise similarity measurement, e.g. $\ell_1$ distance or structural similarities (SSIM).

Nevertheless, the photometric loss is violated when pixels are occluded or moved out of view so that there are no corresponding pixels in $I_2$. Particular embodiments denote these pixels by a binary occlusion map $O_{12}$. In some embodiments, a "map" is a data structure that stores key-value pairs in an array. In some embodiments, this map is obtained by the classical forward-backward checking method, where the backward flow is estimated by swapping the order of input video frames. The photometric loss in the occluded region will be discarded.

Furthermore, supervision solely based on the photometric loss is ambiguous for somewhere textureless or with repetitive patterns. One of the most common ways to reduce ambiguity is named smooth regularization, $$\mathcal{L}_{sm} \sim \sum_{d \in x,y} \sum_p \|\nabla_d U_{12}\|_1 e^{-|\nabla_d I|}, \tag{4}$$

which constrains the prediction similar to the neighbors in x and $y$ directions when no significant image gradient exists.

Formally, particular embodiments define an augmentation parameterized by a random vector θ as $$T_\theta^{img}:$$

$I_t \mapsto \bar{I}_t$, from which one can sample augmented images $\{\bar{I}_1, \bar{I}_2\}$ based on original images $\{I_1, I_2\}$ in the dataset. In the general pipeline, in some embodiments the network is trained with the data sampled from the augmented dataset. Some embodiments train the network on original data, but leverage augmented samples as a regularization.

More specifically, after a regular forward pass for original images, some embodiments additionally run another forward for transformed images to predict the optical flow $$\bar{U}_{12}^*.$$

Meanwhile, the prediction of optical flow in the first forward is transformed consistently by $$T_\theta^{flo}:$$

$U_{12} \mapsto \bar{U}_{12}$.

The basic assumption is that augmentation brings challenging scenes in which the unsupervised loss will be unreliable, while the transformed predictions of original data can provide reliable self-supervision. Therefore, particular embodiments optimize the consistency for the transformed samples instead of the objective of view synthesis. Some embodiments follow the generalized Charbonnier function that commonly used in the supervised learning of optical flow as:

$$\mathcal{L}_{aug} \sim \sum_p \left(\left|S(\bar{U}_{12}(p)) - \bar{U}_{12}^*(p)\right| + \epsilon\right)^q, \tag{5}$$

where $\mathcal{S}$(·) stands for stop-gradient, and the same setting as supervised work with q=0.4 and ∈=0.01 gives less penalty to outliers. For stability, some embodiments stop the gradients of $\mathcal{L}_{aug}$ propagating to the transformed original flow $\bar{U}_{12}$. Also, only the loss in the non-occluded region is considered. After twice forwarding, the photometric loss Eq. (3), the smooth regularization Eq. (4), and the augmentation regularization Eq. (5) are backward at once to update the model.

This learning framework can be integrated with almost all types of augmentation methods. In the following, summarized are three kinds of transformations, which compose the common augmentations for the optical flow task.

With respect to spatial transformation, particular embodiments assume the transformation that results in a change in the location of pixels is called spatial transformation, which includes random crop, flip, zoom, affine transform, or more complicated transformations such as thin-plate-spline or CPAB transformations.

Illustrated below is a general form for these transformations. Let $\tau_\sigma$ be a transformation of pixel coordinates. The transformation of image $$T_\theta^{img}:$$

$I_t \mapsto \bar{I}_t$ can be formulated $$\bar{I}_t(p) = I_t(\tau_\theta(p)), \tag{6}$$

which can be implemented by a differentiable warping process, same as the one used in Eq. (2).

Since changing pixel locations will lead to a change in optical flow, some embodiments warp on an intermediate flow field $\tilde{U}_{12}$ instead of the original flow. The transformation of optical flow is $$T_\theta^{flo}:$$

$U_{12} \mapsto \bar{U}_{12}$ can be formulated as:

$$\begin{cases} \tilde{U}_{12}(p) = \tau_\theta(p + U_{12}(p)) - \tau_\theta(p), \\ \bar{U}_{12}(p) = \tilde{U}(\tau_\theta^{-1}(p)). \end{cases} \tag{7}$$

Additionally, the spatial transformation brings new occlusions. As described above, some embodiments use explicitly reasoning occlusion from the predictions of bi-directional optical flow. Since predictions of transformed samples are noisy, particular embodiments infer the transformed occlusion map from original predictions instead. The transformation $$T_\theta^{occ}:$$

$O_{12} \mapsto \bar{O}_{12}$ includes two parts: the old occlusion $$\bar{O}_{12}^{old}(p)$$

in the new view and the new occlusion $$\bar{O}_{12}^{new}(p)$$

for pixels whose correspondences are out of the boundary $\Omega$. The former can be obtained by the same warping process as $$T_\theta^{img}$$

but with nearest-neighbor interpolation, and the latter can be explicitly estimated from the flow $\bar{U}_{12}$ by checking the boundary:

$$\bar{O}_{12}^{new}(p) = (p + \bar{U}_{12}(p)) \notin \Omega \tag{8}$$

The final transformed occlusion $\bar{O}_{12}$ is a union of these two parts. Note that, the non-occluded pixels in $$\bar{O}_{12}^{old}$$

be occluded in $$\bar{O}_{12}^{new}.$$

It provides an effective way to learn the optical flow in occluded regions. For stability, only the non-occluded pixels in $$\bar{O}_{12}^{old}$$

contribute to the loss $\mathcal{L}_{aug}$.

Because certain embodiments formulate the spatial transformation as a warping process, there might be pixels out of boundary after transformation. The common solution, such as padding with zero or the value of boundary pixels, will lead to severe artifacts. Therefore, some embodiments repeat sampling the transformations until all transformed pixels are in the region of the original view.

Some embodiments integrate occlusion hallucination into one-stage training framework via occlusion transformation. Specifically, there are two steps: (i) Random crop. Random crop is a kind of spatial transformation, but it efficiently creates new occlusion in the boundary. Some embodiments crop the pair of images as a preprocess of occlusion transformation. (ii) Random mask out. Some embodiments randomly mask out some superpixels in the target images with Gaussian noise, which will introduce new occlusion for the source image.

Continuing with FIG. 1, the feature extractor 106 extracts features from one or more video frames and/or one or more patches within a single video frame. For example, the feature extractor 106 can simply extract pixel values and map each pixel value to a corresponding value (e.g., an integer) in one or more matrices, such as three RGB matrices (a "red" color matrix, a "green" color matrix, and a "blue" color matrix). In a colored image, there are typically three Matrices (or channels)—Red, Green, and Blue. Each matrix has values between 0-255 representing the intensity of the color for that pixel. In an illustrative example, a particular red color pixel and its coordinates (X, Y position) can be mapped to a corresponding location and value, such as 256, in a red channel matrix. A pixel value for a particular pixel indicates how bright that pixel is, what color it should be, and/or particular line segments partially defining objects or other content in the image. In binary images, for example, the pixel value is a 1-bit number indicating either foreground or background. Feature extraction is a part of the dimensionality reduction process, in which, an initial set of the raw data (individual video frames) is divided and reduced to more manageable groups, such as individual matrices.

The VOS component 112 is generally responsible for performing video object segmentation (VOS). As described herein, VOS is the process of partitioning or separating out one or more objects in a video frame and/or throughout a video frame sequence. This can include, for example, separating pixels representing a real-world background (e.g., mountain scenery) from pixels representing one or more real-world objects (e.g., cars driving in the mountain scenery). The goal of VOS is to localize objects in a given video sequence (each video frame of a video). In other words, VOS performs foreground-background separation, where the most salient (noticeable or important) object(s) in the video typically forms the foreground. In other words, VOS segments or partitions the background from the foreground, where an "object" is synonymous with the foreground. An "object" in a video frame is a set of multiple pixels/content that represent a single real-world thing, class, or label. For example, an object can correspond to any tangible real world item, such as a car, a dog, a ball, a leaf, or the like. The "background" typically refers to pixels representing real world features behind the real-world objects, such as the sky, clouds, sun, and the like.

The VOS component 112 includes the similarity score generator 114, the graph generator 116, and the graph cut component 118. In order to perform VOS, the VOS component 112 uses the similarity score generator 114, the graph generator 116, and/or the graph cut component 118. The similarity score generator 114 takes, as input, the embedding(s) derived by the embedding component 107 to generate a similarity score for each section of each video frame according to estimated motion extractor 104 and/or the feature extractor 106. In some embodiments, the similarity score generator 114 uses any suitable distance (e.g., cosine or Euclidian) function by comparing corresponding embeddings, where the closer the embeddings are to each other, the higher the score and more similar they are and the farther they are from each other, the lower the score and less similar they are. In an illustrative example, the similarity score generator 114 may compare (e.g., compute a distance of) different embeddings generated by the feature extractor 106, where a first embedding represents the visual feature characteristics of a first section of a first video frame and a second embedding represents the visual feature characteristics of a second section of the same first video frame. Based on the Euclidian distance being within a threshold (e.g., they both contained the same "car" object), the similarity score generator 114 generates a score that indicates a high probability (e.g., 0.90) that the sections contain very similar visual features. This same step can alternatively or additionally be repeated for the embeddings generated by the estimated motion extractor 104. For example, the similarity score generator 114 may compare (e.g., compute a distance of) different embeddings generated by the estimated motion extractor 104, where a third embedding represents the estimated motion information of the first section of the first video frame and a fourth embedding represents the estimated motion information of the second section of the same first video frame. Based on the Euclidian distance being within a threshold (e.g., they were both estimated to be displaced in X and/or Y directions within X pixel threshold), the similarity score generator 114 generates a score that indicates a high probability (e.g., 0.90) that the sections contain very similar estimated motion information.

The similarity score generator 114 can use any suitable method of determining similarity between embeddings, such as pixel-based distance, correlation, descriptor distance, and/or probabilistic matching. For example, regarding pixel-based distance, in some embodiments, the similarity score generator 114 directly compares the pixel values of two patches, e.g. by means of the L1 distance D(x1, x2)=X d|x1(d)−x2(d)| to compute visual feature similarity. In another example, regarding probabilistic matching, instead of measuring distance between patches, the similarity score generator 114 evaluates directly the probability that two patches belong to the same class (in terms of visual feature similarity and/or motion estimation information). This may be limited to models in which a fixed number of patch classes, called parts, are combined in some framework. In yet another example, Normalized correlation between patches x1 and x2 is defined as NC(x1, x2)=P d, where x¯i and σi are the mean and standard deviation of pixels in xi. Because of the factoring in of the means it is much more robust than the pixel-wise distance. Normalized correlation has been used where it is assumed that viewing conditions are fixed between video sections or video frames, or alternatively that there exist examples from all viewing conditions—in other words, not matching a patch to a version of itself rotated by 90 degrees is acceptable.

The video frame graph generator 108 is generally responsible for generating a graph data structure based on using, as input, the similarity score(s) generated by the similarity score generator 114. A graph is a non-linear type of data structure made up of nodes (also known as "vertices") and edges. The edges connect any two nodes in the graph. The graph data structure includes multiple nodes and one or more edges that connect at least one node of the multiple nodes. Each edge may be assigned a numerical value, called weight, often represented as the 'cost' of the respective edge. A weighted graph is the one where all the edges are assigned some weights. In some embodiments, each node represents a respective section of a video frame parsed by the video frame patch generator 102. In some embodiments, each edge is associated with one or more weights that represent or indicate the measure of similarity between respective sections of the video frame as computed by the similarity score generator 114. The graph data structure is described in more detail below.

The graph cut component 118 is generally responsible for performing a graph cut on the graph data structure, where the graph cut represents grouping one or more nodes together based on the measure of similarity (or weights of the edges) exceeding a threshold or value. A weighted graph can be split into disjointed sets of nodes. The higher the similarity scores between nodes, the more likely they will be grouped in a graph cut, whereas the lower the similarity between nodes, the more likely they will not be grouped in a graph cut, but rather disassociated. A graph cut is a technique to group different nodes of a graph. In some embodiments, the degree of dissimilarity or similarity between these two groups is computed as total weight of the edges removed, in order to create multiple sets of nodes, often referred as the 'cost' of the cut. In some embodiments, graph cutting includes removing or deleting links between nodes that have a similarity score below a threshold. In some embodiments, graph cutting includes cutting a set of edges whose removal makes a graph disconnected. Graph cuts are described in more detail below.

In some embodiments, and as described herein, performing VOS does not require or use certain machine learning model learning or inference functionality, such as object detection (via learning a bounding box position or label) or panoptic segmentation (to learn the boundaries of objects detected). In other embodiments, however, this functionality is used. It is also understood that in some embodiments, one or more components of the system 100 need not be used for VOS. For example, in some embodiments, neither a graph generator 116 nor a graph cut component 118 is used. Rather, in some embodiments, VOS, as performed by the VOS component 112, uses raw data from the similarity score generator 114 to group different sections of different video frames. For example, if two nodes are within a similarity score threshold, the VOS component 112 can populate any suitable data structure (e.g., a lookup table or hash map), where the section is a key, and the values are other sections that are similar over a threshold according to the similarity scores.

The presentation component 120 is generally responsible for causing presentation of content and related information to a user by using results from the VOS component 112 as input. For example, the presentation component 120 can generate accurate and temporally consistent segmentation masks for objects in each video frame of a video frame sequence. In another example, in some embodiments, the presentation component 120 changes each pixel value that makes up an object with a single pixel value (i.e., a segmentation mask), such as a red color and/or the exact confidence value (e.g., 0.90) that indicates the estimated object and estimated tracking positions in each video frame, of a sequence of video frames.

In some embodiments, the presentation component 120 comprises one or more applications or services on a user device, across multiple user devices, or in the cloud. For example, in one embodiment, presentation component 120 manages the presentation of content to a user across multiple user devices associated with that user. Based on content logic, device features, associated logical hubs, inferred logical location of the user, and/or other user data, presentation component 120 may determine on which user device(s) content is presented, as well as the context of the presentation, such as how (or in what format and how much content, which can be dependent on the user device or context) it is presented and/or when it is presented. In particular, in some embodiments, presentation component 120 applies content logic to device features, associated logical hubs, inferred logical locations, or sensed user data to determine aspects of content presentation.

In some embodiments, presentation component 120 generates user interface features (or causes generation of such features) associated with pages. Such features can include user interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, a personal assistant service or application operating in conjunction with presentation component 120 determines when and how to present the content. In such embodiments, the content, including content logic, may be understood as a recommendation to the presentation component 230 (and/or personal assistant service or application) for when and how to present the notification, which may be overridden by the personal assistant app or presentation component 120.

Storage 105 generally stores information including data (e.g., images), computer instructions (for example, software program instructions, routines, or services), data structures, and/or models used in embodiments of the technologies described herein. In some embodiments, storage 105 represents any suitable data repository or device, such as a database, a data warehouse, RAM, cache, disk, RAID, and/or a storage network (e.g., Storage Area Network (SAN)). In some embodiments, storage 105 includes data records (e.g., database rows) that contain any suitable information described herein. In some embodiments, each record is called or requested and returned, over the computer network(s) 110, depending on the component needing it, as described herein.

Figure 2:
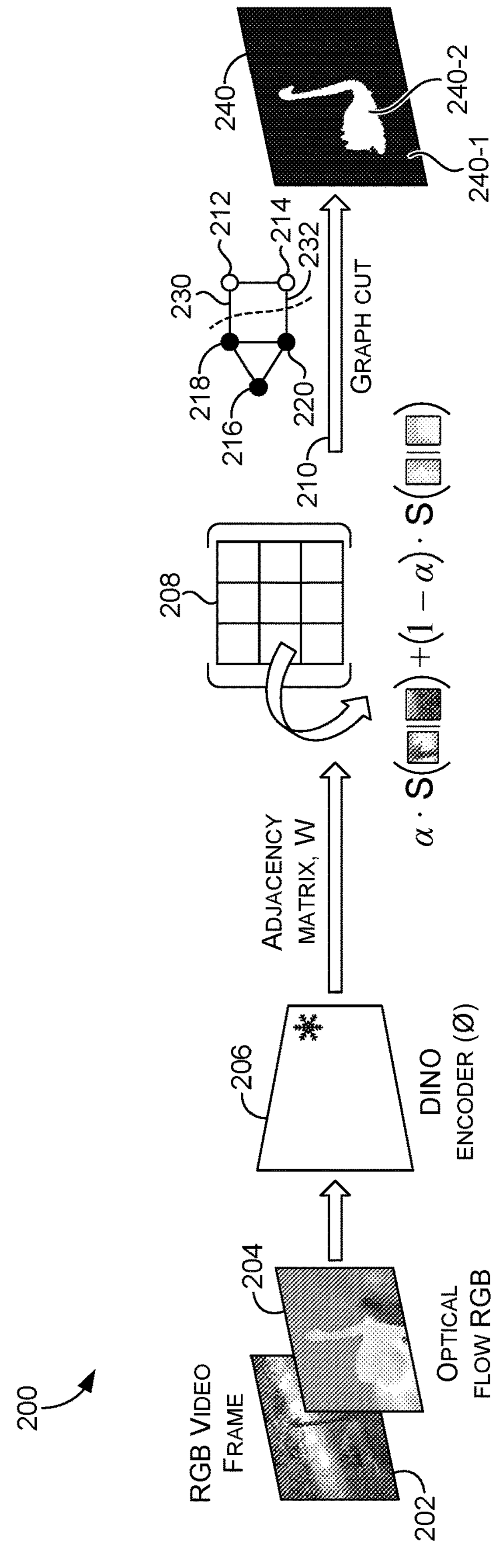
FIG. 2 is a schematic diagram illustrating the inputs and outputs for performing a graph cut on an adjacency matrix representing a graph for video object segmentation, according to some embodiments.

FIG. 2 is a schematic diagram illustrating the inputs and outputs for performing a graph cut on an adjacency matrix representing a graph for video object segmentation, according to some embodiments. In some embodiments, the DINO ("Self-distillation with no labels") encoder 206 represents the embedding component 107 of FIG. 1. In some embodiments, the adjacency matrix 208 represents the graph as generated by the graph generator 116 and/or the embeddings generated by the embedding component 107 of FIG. 1. In some embodiments, the graph cut 210 represents the graph cut as performed and described with respect to the graph cut component 118 of FIG. 1. In some embodiments, the output image 240 represents what is produced by the VOS component 112 of FIG. 1.

FIG. 2 illustrates an end-to-end graph-cut pipeline for unsupervised video object segmentation. An image 202 and its corresponding optical flow RGB 204 are featurized using a self-supervised ViT (i.e., DINO encoder 206). FIG. 2 illustrates the use of a similarity function (S) to produce a graph 208 with weights corresponding to a linear combination of appearance features similarity and flow features similarity (weighted by a). Finally, embodiments perform a graph cut to create a bipartition of image patches into foreground/background regions. Put more specifically, at a first time, a particular video frame 202 and optical flow RGB 204 (i.e., estimated motion information) are fed, as input, into the DINO encoder 206. Responsively, the DINO encoder 206 generates various non-overlapping patches of the RGB video frame 202 and, for each patch, generates an embedding, which indicates both visual features of the patch and estimated motion information for the patch. In some embodiments, the optical flow RGB 204 is a map or image that includes transformed or warped pixels that indicated estimated motion information as described with respect to the estimated motion extractor 104 of FIG. 1. Various embodiments, such as the graph generator 116, take the embeddings as input to generate an adjacency matrix. An adjacency matrix of a graph is a matrix with rows and columns labeled by graph vertices, with a 1 or 0 in position (v_i,v_j) according to whether v_i and v_j are adjacent or not. In other words, an adjacency matrix is a two-dimensional matrix used to map the association between the nodes of a graph. A graph is a set of vertices (nodes) connected by edges. The formulation of the adjacency matrix 208 and graph cut 210 are described in more detail with respect to FIGS. 4A and 4B.

Responsively, particular embodiments, such as the graph cut component 118, perform the graph cut 210 in order to group the nodes 212 and 214 together and also group the nodes 220, 216, and 218 together via removal of the edges 230 and 232, where, for example, nodes 212 and 214 represent the goose object 240 and the nodes 216, 218, and 220 represent the masked background 240-1 in the output image. In other words, the output video frame 240 represents the final output of video object segmentation of the video frame 202, where the foreground dove object 240-2 represents the input image dove object 202-2 and the background 240-1 represents the background 202-1, except that the dove object 240-1 and the background 240-1 have been masked or filled in with a single unique value (black and white) so as to define the boundaries of the object (the goose) and the background.

FIG. 2 therefore illustrates that for a given video frame, particular embodiments compute the optical flow in RGB format and process the video frame in conjunction with its flow using a self-supervised ViT, like DINO. Next, particular embodiments build a graph (represented by an adjacency matrix) with image patches as the nodes and propose a linear combination of image feature similarity scores and flow feature similarity scores to be used as weights between the image patches. Particular embodiments perform a graph cut on the adjacency matrix W to obtain a bipartition of the image into foreground and background regions, which gives the final video object segmentation. Accordingly, at least with respect to FIG. 2, embodiments deviate from the learning paradigm of the deep-learning era to propose an effecting learning-free method to solve the challenging VOS problem. Specifically, FIG. 2 combines appearance (i.e., feature similarity) and flow information to produce high-quality segmentation masks via one or more graph cuts on one or more video frames of a video. This demonstrates the importance of perceptual motion cues for object discovery or detection. Following the Gestalt principle of common fate—"things that move together, belong together," FIG. 2 illustrates that optical flow can complement object discovery process in videos.

Figure 3:
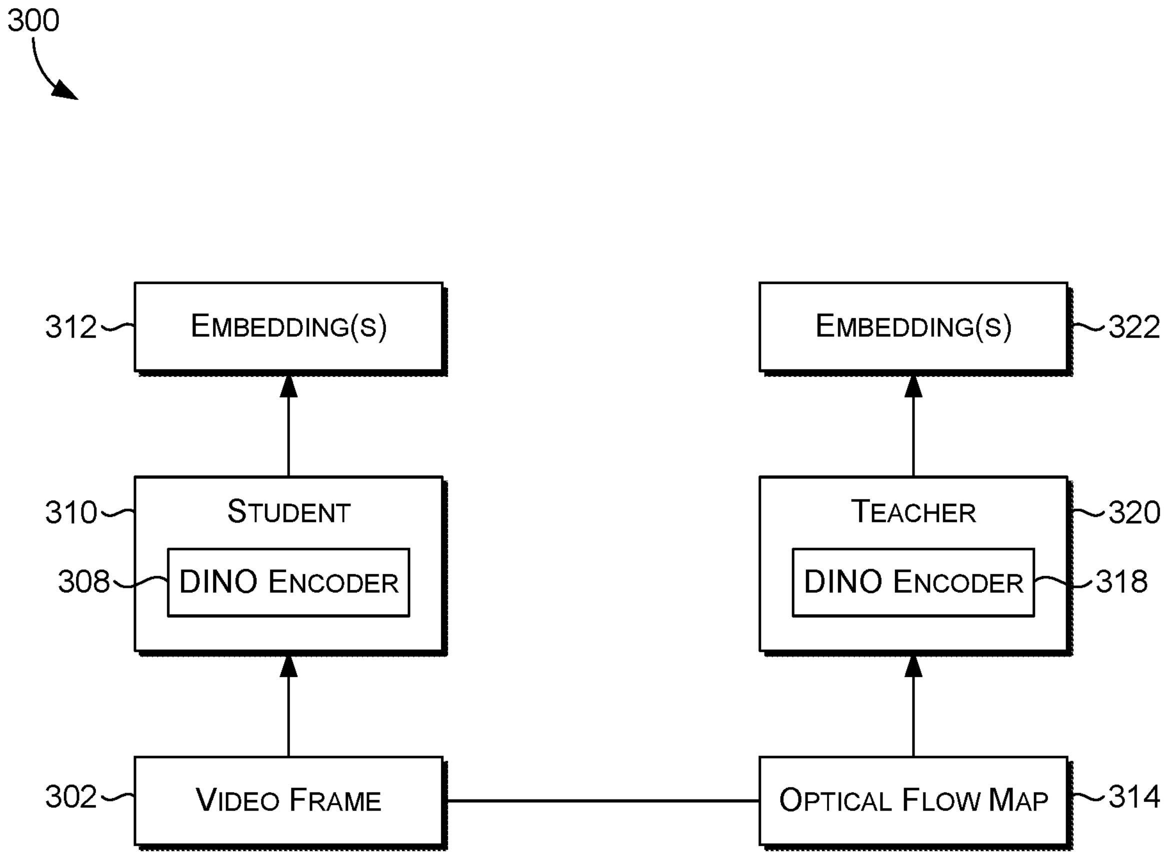
FIG. 3 is a block diagram of an example modified DINO model in order to derive embeddings representing a video frame and the optical flow map, according to some embodiments.

FIG. 3 is a block diagram of an example modified DINO model 300 in order to derive embeddings representing the video frame 302 and the optical flow map 314, according to some embodiments. In some embodiments, the modified DINO model 300 represents the embedding component 107 of FIG. 1. In some embodiments, the DINO encoder 308 and/or 318 represent the DINO encoder 206 of FIG. 2. In some embodiments, the video frame 302 represents the RGB video frame 202. In some embodiments, the optical flow 314 represents the optical flow RGB 204 of FIG. 2.

DINO models typically automatically learn class-specific features of image frames leading to accurate unsupervised video object segmentation. There is a teacher and student network both having the same architecture, typically a ViT. A Student ViT typically learns to predict global features in an image from local patches supervised by the cross entropy loss from a momentum Teacher ViT's embeddings while doing centering and sharpening to prevent collapse. However, various embodiments of the present disclosure do not employ the entire pipeline of typical DINO models. For example, some embodiments do not generate a softmax score indicative of a prediction of whether different crops or augmentations (e.g., jitter) of an image refer to the same image. Rather, particular embodiments just use the student and teacher networks 310 and 321 to derive the embeddings 312 and 322, which are respective representations (e.g., vectors) of the video frame 302 and optical flow 314.

After the video frame 302 has been received, the DINO encoder 308 of the student 310 encodes the video frame 302 into the embedding(s) 312. For example, the DINO encoder 308 may be a ViT that first splits the video frame 302 into smaller patches, then flattens the patches (e.g., by converting a matrix representing each patch into a 1D vector representing each sequential pixel or other content unit), produces lower-dimensional linear embeddings from the flattened patches, adds positional embeddings, which sequence is then fed as an input to the DINO encoder 308 to produce the embedding(s) 312 (e.g., a vector representing each sequential section of the video frame 302 and an indication of the position of the section with respect to the entire video frame 302). Similarly, after the optical flow map 314 has been received, the DINO encoder 318 of the teacher 320 encodes the optical flow map 314 into the embedding(s) 322. In some embodiments, the embedding(s) 312 and 322 indicate a particular quantity of feature dimensions and patch size (the quantity of patches a video frame will contain) used for image tokenization. For example, in some embodiments, the DINO encoders 308 and 318 represent ViT-B/8, which are particular vision transformers and which produce features of dimension 768 with a patch size of 8.

In some embodiments, during pre-training (i.e., before the processing of the video frame 302 and the optical flow map 314) or runtime (i.e., the processing of the video frame 302 and the optical flow map 314), each video frame (or the video frame 302 and/or the optical flow map 314) is first augmented before being processed by the respective DINO encoders 308 and 318. For example, the augmented video frame(s) may represent different cropped (sections) of the video frame 302. For example, the video frame 302 may represent a dog object, and a first augmented video frame may represent the dog object's hind legs and a second augmented video frame may represent the dog object's front legs. The optical flow map 314 may additionally or alternatively be augmented to derive one or more augmented optical flow maps. In some embodiments, the augmented optical flow map(s) represent different global (i.e., entire instead of a subsection) iterations of the optical flow map 314. For example, the augmented optical flow map(s) may include an upside down image of a dog and an upright position of a dog, or other warped image (e.g., an affine warp). As is common in self-supervised learning, different crops of one image are taken. Small crops are referred to as Local views (<50% of the image) and large crops (>50% of the image) are called Global views. All crops are passed through the student 310 while only the global or entire views are passed through the teacher 320. This encourages "local-to-global" correspondence, during pre-training of the student 310 to interpolate context from a small crop.

In some embodiments, during pre-training, the student 310 and teacher 320 are trained on different augmentations of video frames only (not optical flow maps). In some embodiments, during pre-training, exponential moving average is used to update the teacher 320 from the student 310. In some embodiments, such as during pre-training or during processing of the video frame 302 and the optical flow map 314, random augmentations of color jittering, Gaussian blur and solarization are also applied on the video frame 302 and the optical flow map 314 to make the network more robust. During pre-training, the teacher 320 and student 310 each predict a 1-dimensional embedding. A softmax along with cross entropy loss is applied to make student 310's distribution match the teacher 320's. Softmax converts the raw activations to represent how much each feature was present relative to the whole. The student 310 should have the same proportions of features as the teacher 320. The teacher 320 having a larger context predicts more high level features which the student 310 are also to match. The cross-entropy loss tries to make the two distributions the same just as in knowledge distillation.

Figure 4A:
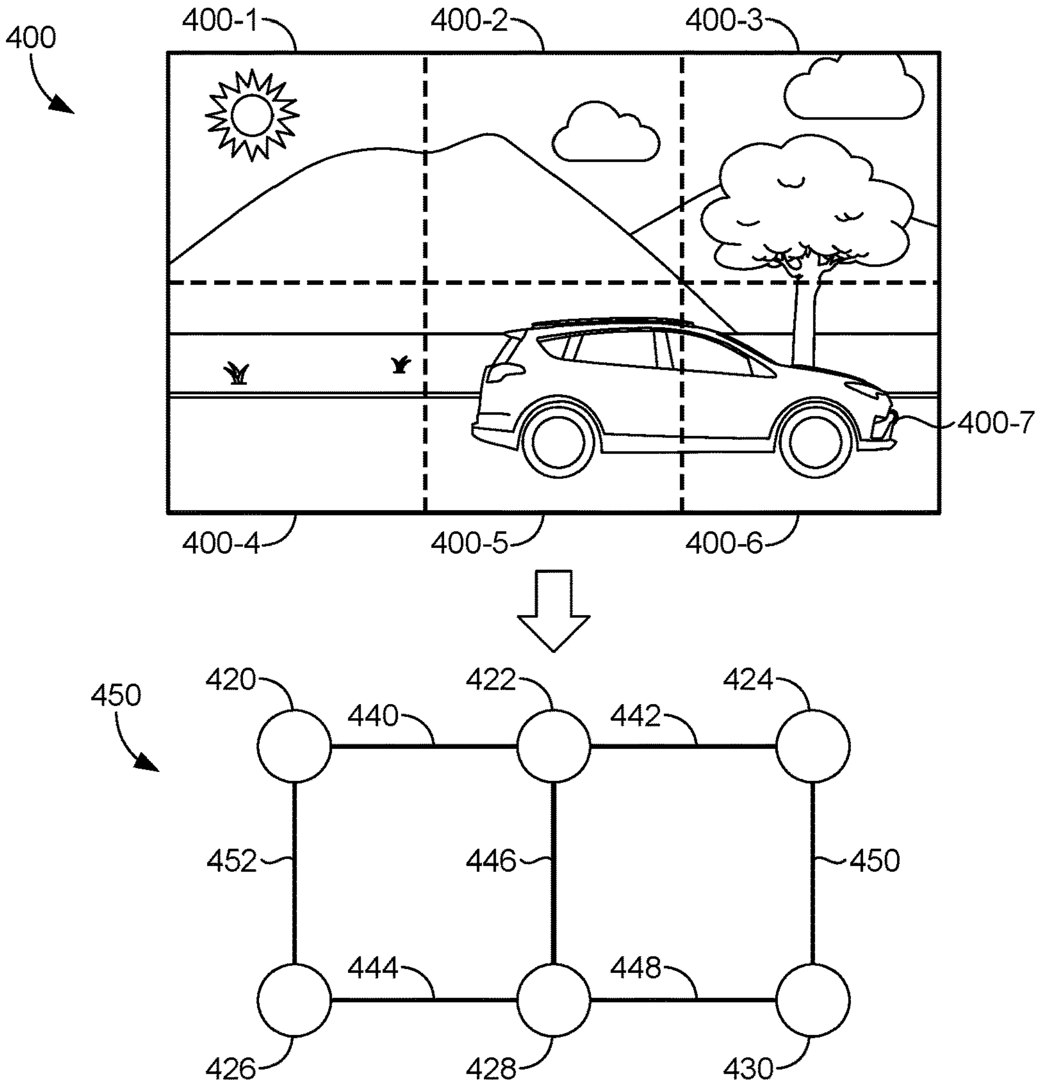
FIG. 4A is a schematic diagram illustrating how a graph, which represents a sectioned video frame (and/or an optical flow), is generated, according to some embodiments.

FIG. 4A is a schematic diagram illustrating how a graph 450, which represents a sectioned video frame 400 (and/or an optical flow), is generated, according to some embodiments. In some embodiments, the video frame 400 represents the RGB video frame 202 of FIG. 2 (except that the video frame 400 has already been patched by the DINO encoder 206). In some embodiments, the video frame 400 additionally (or alternatively) represents the Optical flow RGB 204 of FIG. 2 (except that the video frame 400 has already been patched by the DINO encoder 206). In some embodiments, the graph 450 represents the adjacency matrix 208 of FIG. 2.

FIG. 4A illustrates a video frame 400, which contains 6 square non-overlapping sections or patches 400-1, 400-2, 400-3, 400-4, 400-5, and 400-6, where, for example, the patching is performed by the DINO encoder 206 of FIG. 2. Each non-overlapping sections or patches include multiple pixels. The video frame 400 illustrates the car object 400-7, for which a portion is depicted in both patches 400-5 and 400-6. For purposes of this illustration, the car object 400-7 is the only object that moved (relative to motion information indicated in previous video frames).

The graph 450 includes nodes 420, 422, 424, 426, 428, and 430, and corresponding edges 440, 442, 444, 446, 448, 450, and 452. Each node of the graph 450 represents a corresponding section in the video frame 400. For example, node 420 represents section 400-1, node 422 represents section 400-2, node 424 represents section 400-3, node 426 represents section 400-4, node 428 represents section 400-5, and node 430 represents section 400-6. In some embodiments, however each node in the graph 450 may represent a smaller unit, such as each pixel in the video frame 400. Each edge in the graph represents the positional adjacency between sections. For example, the edge 440 indicates that sections 400-1 and 4002 are connected to each other in their respective positions (the section 400-1 is to the left and the section 400-2 is immediately to the right of the section 400-1). In another example, the edge 452 indicates that sections 400-1 and 400-4 are connected to each other in their respective positions (the section 400-1 is to the left and the section 400-4 is immediately below the section 400-1). Each edge is associated with one or more corresponding weights (e.g., denoted by a thickness of the edges, a value, and/or a quantity of edges between nodes). As described in more detail below, each weight represents one or more similarity scores between corresponding nodes or image sections.

Figure 4B:
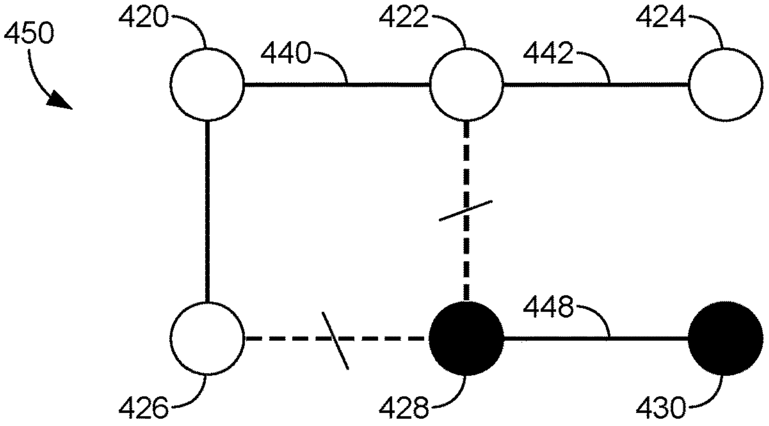
FIG. 4B is a schematic diagram of the graph of FIG. 4A, except a graph cut has been performed, according to some embodiments.

FIG. 4B is a schematic diagram of the graph 450 of FIG. 4A, except a graph cut has been performed, according to some embodiments. As illustrated in FIG. 4B, the edges 446 and 444 have been removed such that nodes 428 and 439 are grouped together (and nodes 420, 422, 424, and 426 are grouped together). As described above, the nodes 428 and 430 respectively represent sections 400-5 and 400-6 in the video frame 400. Both sections contain a portion of the car object 400-7. Accordingly, the nodes 428 and 430 may have been grouped together because the weight(s) between them have exceeded a threshold—i.e., the motion information (e.g., optical flow) and/or visual feature similarity may have been above a threshold. For example, each pixel in the car object 400-7 may have had a steady displacement along the X-axis in two previous consecutive video frames (e.g., each pixel moved the same pixel distance between video frames), thus making the similarity higher and the visual image feature similarity may be above a threshold because the same car object 400-7 is included in both sections 400-5 and 4007. Consequently, the nodes 428 and 430 are grouped together via the edge 448 (and removal of the edges 446 and 444).

With respect to the graph cut of FIG. 4B (or any graph cut described herein), given a graph (e.g., graph 450) G=(V, E) where V is a set of nodes (e.g., nodes 420, 422, 424, 426,

428, and 430) and E is the set of edges (e.g., edges 440, 442, 452, 444, 446, 448, and 450), it seeks to partition G into two disjoint sets P and Q. The Ncut energy is minimized by the optimal graph-cut, as given by:

$$\frac{U(P,Q)}{U(P,V)}+\frac{U(P,Q)}{U(Q,V)} \quad (9)$$

Here, U is a similarity measure between two sets. $U(P, Q)=\Sigma_{i,j}\,w(p_i, q_j)$, where $p_i$ and $q_j$ are the nodes in subgraphs P and Q respectively and $w(p_i, q_j)$ denotes the weight between these two nodes.

The diagonal matrix formed is denoted by taking the sum of weights of all edges going out of a node in G by D, i.e., the diagonal elements of D can be written as:

$$d_i = \sum_j E_{ij}$$

The second-smallest eigenvector of the generalized eigensystem gives the solution to the Ncut problem:

$$(D-E)z=\lambda Dz \quad (10)$$

In particular, the bi-partition of G can be obtained by thresholding the vertices on the average value of the solution obtained from equation 10.

Consider a video frame f (e.g., video frame 400), objects of which embodiments segment out. The process starts by creating a fully-connected graph G=(V, E) (e.g., graph 450), where V denotes the set of vertices obtained by dividing f into square patches (e.g., sections 400-1 through 400-6) of size $p_s \times p_s$ and E denotes the set of edges such that each edge weight quantifies the similarity between connecting vertices (in our case, image patches/sections). Formally, the adjacency matrix W underlying G is made of $v_{ij}=S(v_i, w_j)$, where S(·) denotes the similarity measure between two given vertices (patches).

When compared to standalone images, video frames are special as they track information about a set of objects temporally, in continuation. Since the main aim of VOS is to segment out such objects, particular embodiments incorporate perceptual nuances in the similarity measure S. Some embodiments define $S(v_i, v_j)$ based on Gestalt's principle of common fate—"things that move together, belong together". Formally, in some embodiments, the overall similarity score between two patches from the same video frame is defined as a linear combination of similarity between standard patch embeddings (i.e., visual image feature similarity) and that between the embeddings of the RGB-optical flow at the respective patches.

A vision transformer trained in a self-supervised manner contains explicit information about the semantic segmentation of an image. Motivated by this finding, particular embodiments use a pre-trained DINO encoder (e.g., the DINO encoder 206) to obtain the embeddings. In formal notation, S can be written as:

$$S(v_i, v_j) = \alpha \cdot S'(\phi(v_i), \phi(v_j)) + (1-\alpha) \cdot S'(\phi(\psi(v_i)), \phi(\psi(v_j))) \quad (11)$$

where $\alpha \in [0,1]$, $\phi(\cdot)$ denotes the DINO encoder, $\psi(\cdot)$ denotes the RGB-optical flow estimator, i.e., model computing optical flow in 3-channel RGB image format (e.g., optical flow RGB 204 of FIG. 2), and $S'(\cdot)$ is the cosine similarity function, given by $$S'(\vec{x}, \vec{y}) = \frac{\vec{x} \cdot \vec{y}}{\|\vec{x}\|_2 \|\vec{y}\|_2}.$$

Particular embodiments obtain W using the S defined above, i.e., $W=[w_{ij}]=[S(v_i, v_j)]$.

Further, in order to minimize the variance, some embodiments normalize $w_{ij}$'s by thresholding them.

$$\omega_{ij} \leftarrow \begin{cases} 1, & \text{if } \omega_{ij} \geq \tau \\ \epsilon, & \text{otherwise} \end{cases}$$

where $\tau$ denotes the weight threshold hyper-parameter, and value of $\epsilon$ is set to $10^{-5}(\neq 0)$ to ensure the fully connectedness of G. Next, particular embodiments find the optimal bi-partition of image patches by solving for the second-smallest eigenvector of the equation 10 and thresholding as described above. These bi-partitions denote the foreground (e.g., objects) and background regions. Additionally, to differentiate foreground from background, particular embodiments make use of the largest absolute value of the eigenvector. Particular embodiments intuit that the salient object forms the foreground, and hence eigenvector corresponding to foreground should have larger absolute value than the background. An eigenvector of A is a nonzero vector v in Rn such that $Av=\lambda v$, for some scalar $\lambda$.

Since the partitions are identified at patch-level, particular embodiments perform only a single step of post-processing using CRF ("Conditional Random Field"). CRF is a class of discriminative model(s) best suited to prediction tasks where contextual information or state of the neighbors affect the current prediction. With CRF in the context of VOS, The goal is to label every pixel in the image with one of several predetermined object categories, thus concurrently performing recognition and segmentation of multiple object classes. A common approach is to pose this problem as maximum a posteriori (MAP) inference in a conditional random field (CRF) defined over pixels or image patches. The CRF potentials incorporate smoothness terms that maximize label agreement between similar pixels, and can integrate more elaborate terms that model contextual relationships between object classes. Particular embodiments explore a different model structure for accurate semantic segmentation and labeling. These embodiments use a fully connected CRF that establishes pairwise potentials on all pairs of pixels in the image. These embodiments connect pairs of individual pixels in the image, enabling greatly refined segmentation and labeling. Specifically, these embodiments employ a highly efficient inference algorithm for fully connected CRF models in which the pairwise edge potentials are defined by a linear combination of Gaussian kernels in an arbitrary feature space. The algorithm is based on a mean field approximation to the CRF distribution. This approximation is iteratively optimized through a series of message passing steps, each of which updates a single variable by aggregating information from all other variables. A mean field update of all variables in a fully connected CRF can be performed using Gaussian filtering in feature space. This allows a reduction of the computational complexity of message passing from quadratic to linear in the number of variables by employing efficient approximate high-dimensional filtering. The resulting approximate inference algorithm is sublinear in the number of edges in the model.

Figure 5A:
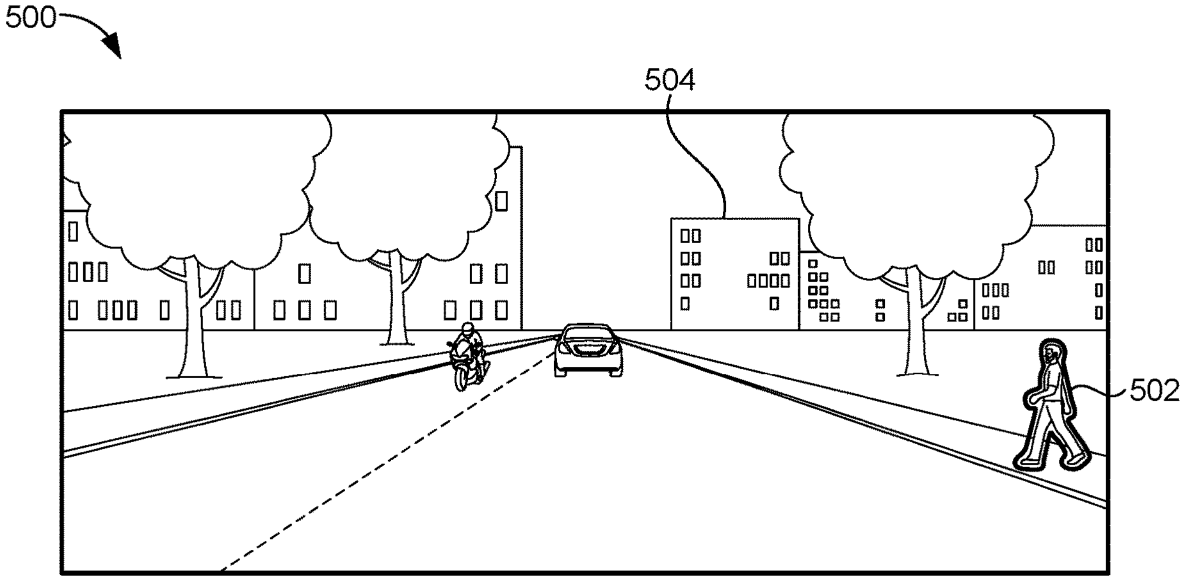
FIG. 5A is a schematic diagram illustrating video object segmentation of a first video frame, according to some embodiments.

FIG. 5A is a schematic diagram illustrating video object segmentation of a first video frame 500, according to some embodiments. In some embodiments, the video frame represents the final output, such as what is presented via the presentation component 120 of FIG. 1 or the output image 240 of FIG. 1. The video frame 500 includes a segmentation mask 502, which are pixels that define a corresponding person object. The video frame 500 also includes pixels 504 representing a background of the image 500.

In an illustrative example, at a first time, the DINO encoder 206 can process an input video frame, which is identical to the video frame 500, except that each pixel of the segmentation mask 502 is not represented by the single pixel value (e.g., a red color). That is, the segmentation mask 502 (or more specifically the person object) may originally include multiple pixels with some pixels representing different values, representing various differing features, such as a color of hair, shirt, pants, and the like. In response to the DINO encoder 206 processing the input image and optical flow information, it generates one or more embeddings and is processed by the VOS component 112 of FIG. 1. For example, in response to performing a graph cut (as described with respect to FIG. 4B) of nodes and thus patches representing or including the person object, particular embodiments change each pixel that makes up the person object to a single pixel value (or a set of values within a pixel value threshold), as illustrated by the segmentation mask 502. For example, particular embodiments can change each pixel value of each pixel within the person object to a red or green color segmentation mask.

Figure 5B:
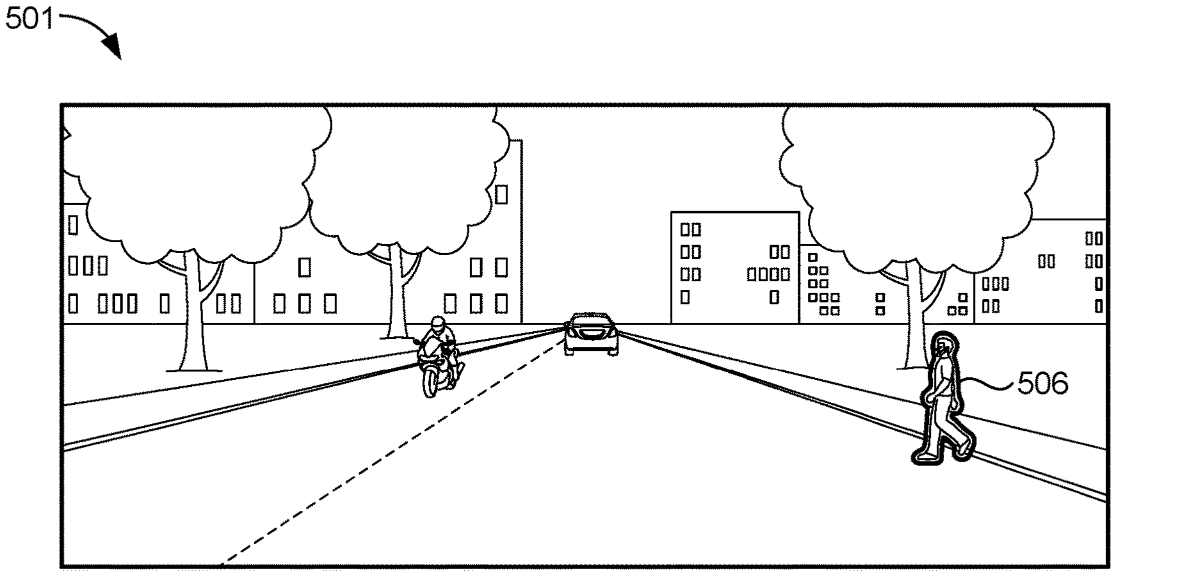
FIG. 5B is a schematic diagram illustrating video object segmentation of a second video frame that immediately follows the first video frame of FIG. 5B in a video sequence, according to some embodiments.

FIG. 5B is a schematic diagram illustrating video object segmentation of a second video frame 501 that immediately follows the first video frame 500 of FIG. 5B in a video sequence, according to some embodiments. In some embodiments, the video frame 501 represents the final output, such as what is presented via the presentation component 120 of FIG. 1 or the output image 240 of FIG. 1. The video frame 501 includes a segmentation mask 506, which are pixels that define a corresponding person object.

In an illustrative example, at a second time (subsequent to the first time), the DINO encoder 206 can process a second input video frame, which is identical to the video frame 501, except that each pixel of the segmentation mask 506 is not represented by the single pixel value (e.g., a red color). That is, the person object may originally include multiple pixels with some pixels representing different values, representing various differing features, such as a color of hair, shirt, pants, and the like. In some embodiments, the DINO encoder 206 processes the second input image via deriving optical flow information based on estimated motion information for each pixel represented by the person object of the video frame 500 of FIG. 5A. For example, the estimated motion information for video frame 501 can include an indication that a first pixel from 502 has moved to a distance of A in the X direction and B in the Y direction from video frame 500 to video frame 501. Based on this information, particular embodiments generate other estimation motion information for video frame 501, such as predicting that the same pixel in 506 will similarly (or within a threshold distance of) move to a distance of A in the X direction and B in the Y direction for the next video frame (not shown; a subsequent video frame after 501) based on the same pixel having moved this distance from video frame 500 to 501.

The DINO encoder can then generate one or more embeddings and is processed by the VOS component 112 of FIG. 1. For example, in response to performing a graph cut (as described with respect to FIG. 4B) of nodes and thus patches representing or including the person object, particular embodiments change each pixel that makes up the person object to a single pixel value (or a set of values within a pixel value threshold), as illustrated by the segmentation mask 506. For example, particular embodiments can change each pixel value of each pixel within the person object to the same color (e.g., red or green) as is represented by the segmentation mask 502 of the image 500 in FIG. 5A. In this way, in a video sequence, particular embodiments can track the person object (represented by 502 and 506 in different video frames) via the same color/pixel value/segmentation mask across different video frames. Accordingly, for example, the person object is tracked while they are walking from the sidewalk to the middle of the street, as illustrated in FIGS. 5A and 5B, which can be used in different applications, such as autonomous driving where, for example, an autonomous car is programmed to stop in response to detecting the person crossing the road.

Exemplary Flow Diagrams

Figure 6:
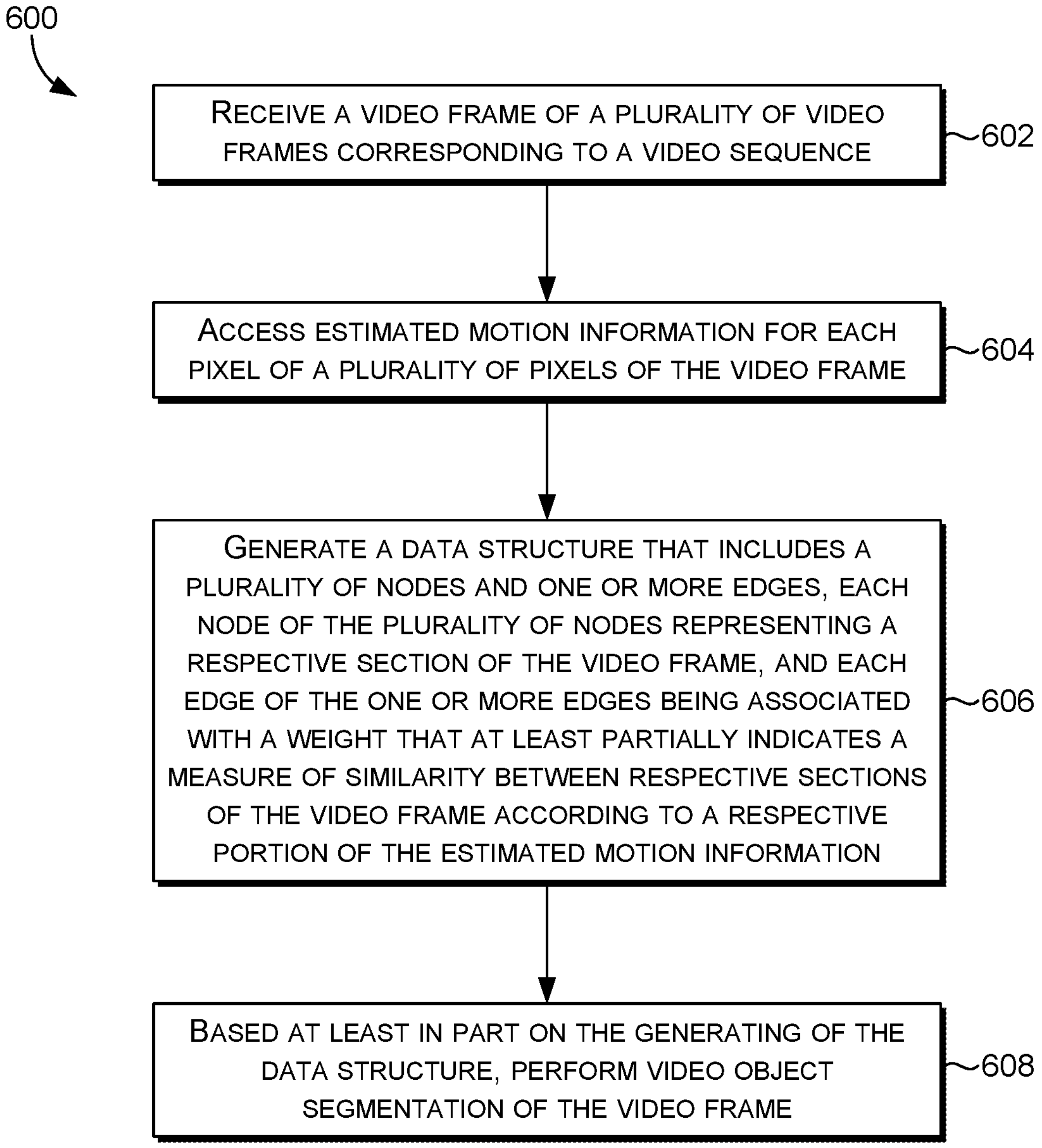
FIG. 6 is a flow diagram of an example process for performing video object segmentation, according to some embodiments.

FIG. 6 is a flow diagram of an example process 600 for performing video object segmentation, according to some embodiments. The process 600 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 5B). The computer-implemented method, the system (that includes at least one computing device having at least one processor and at least one computer readable storage medium), and/or the computer readable medium as described herein may perform or be caused to perform the process 600 or any other functionality described herein.

Per block 602, some embodiments (e.g., an embedding means, such as the embedding component 107) receive a video frame, of a plurality of video frames corresponding to a video sequence. Per block 604, some embodiments (e.g., an estimated motion extractor means, such as the estimated motion extractor 104) access estimated motion information for each pixel, of a plurality of pixels of the video frame. For example, as described with respect to the optical flow RGB 204 or the estimated motion extractor 104, particular embodiments can receive an optical flow image that resembles the video frame, except that corresponding pixels (e.g., indicated in a foreground object) have been warped or transformed relative to the video frame, where the corresponding pixels indicate estimated displacement from their position in the video frame. However, in some embodiments, "estimated" motion information need not be received, but any suitable "motion information." For example, motion information can include a pixel's (from the video frame) current distance displacement in X and Y directions relative to a previous proceeding processed video frame. In some embodiments, motion information can additionally include estimated displacement of the pixel in a next succeeding video frame. In some embodiments, block 604 includes any of the functionality as described with respect to the estimated motion extractor 104 of FIG. 1. In some embodiments, estimated motion information need not always be accessed (e.g., from a memory address in memory). Rather, particular embodiments additionally or alternatively receive (e.g., from a compute node or component) or determine the estimation motion information.

In some embodiments, the estimated motion information includes optical flow information that indicates a predicted displacement (e.g., in direction and magnitude) of each pixel from the video frame (or only a portion of the video frame), of the plurality of video frames. For example, optical flow information can include a map that indicates predicted X and Y displacement, as well as predicted velocity of the pixel from the video frame to a second succeeding video frame based, for example, on observed displacement and/or velocity of the same corresponding pixels in a proceeding prior video frame to the video frame. It is understood that the estimated motion information need not include optical flow information, but can instead be, calculated via peak detection and fitting, block matching, absolute difference between two video frames, integer pixel shifts, or the like.

In some embodiments, in response to the receiving of the video frame and estimated motion information at blocks 602 and 604, some embodiments derive, via a pre-trained vision transformer, one or more embeddings that are one or more encoded representation of the video frame and the estimated motion information, where the one or more embeddings are used as input for the generating of the data structure at block 606. For example, referring back to FIG. 2, the DINO encoder 206 (a type of pre-trained vision transformer) can derive embeddings from the RGB video frame 202 and the Optical flow RGB 204.

Per block 606, some embodiments generate (or receive) a data structure that includes a plurality of nodes and one or more edges, where each node, of the plurality of nodes, represents a respective section of the video frame, and where each edge, of the one or more edges is associated with a weight that at least partially indicates a measure of similarity between respective sections of the video frame according to a respective portion of the estimated motion information. For example, particular embodiments generate the graph data structure 450, as described with respect to FIG. 4A.

In some embodiments, the weight of the graph at block 606 additionally (or alternatively) indicates a second measure of similarity between respective sections of the video frame according to image feature similarity between the respective sections. "Feature similarity" refers to visual pixel-wise similarity between different sections of the video frame. For example, particular embodiments determine a difference in a pixel value in a first section and a corresponding pixel value in a section and/or determine an absolute difference in pixel values between all pixels in the first section and all pixel values of all pixels in the second section. As described herein, some embodiments encode or convert each pixel value into a corresponding number (e.g., float), which represents the pixel value so that, for example, determining differences between the values can be easier to calculate.

In some embodiments, the data structure describe in block 606 need not be generated at all. Rather, one or more similarity scores can be generated, which perform a similar function to the weights. Alternatively, the "measure of similarity" associated with the weights can first be proceeded by generating the one or more similarity scores. In an illustrative example of the "one or more similarity scores," particular embodiments can generate a first similarity score that indicates a measure of feature similarity between a first section, of a plurality of sections.

Prior to the generating of the first similarity score (or any similarity score described herein), some embodiments first parse the video frame into a plurality of section. In some embodiments, this includes the functionality as described, for example, with respect to the image 400 of FIG. 4A, which has been parsed into 6 sections—400-1 through 400-6. In some embodiments, such parsing is performed by a ViT encoder, such as the DINO encoder 206, as described herein.

Some embodiments also generate a second similarity score that indicates a measure of estimated motion information similarity between the first section and the section. Such measure of similarity, in some embodiments, is performed at the pixel level for each of the first and section sections. For example, for a first pixel in the first section, there may have been a displacement in the Y direction at a distance of 5. For a second pixel in the second section, there may have been a displacement in the Y direction at a distance of 5.5. Some embodiments, then determine, via cosine similarity, and/or linear difference (i.e., 0.5 for the Y direction) the difference.

For any two sections of the video frame, some embodiments take the two image feature embeddings (illustrating the encoded video frame section itself) as well as two optical flow embodiments to calculate cosine similarity between the two image embeddings, then multiply by alpha. Similarity, some embodiments take the corresponding optical flow embeddings and calculate cosine similarity, and then multiply by 1 minus alpha. Then particular embodiments sum both of those scores to produce the final similarity score between those two sections.

In some embodiments, there need not be a "first" or "second" similarity score generated, but one or more similarity scores, which may be, for example, an aggregated or consolidated similarity score that indicates a measure of feature similarity between the first section and the section and a measure of estimated motion information similarity between the first and second section.

Continuing with FIG. 6, per block 608, based at least in part on the generating of the data structure, some embodiments perform video object segmentation of the video frame. Alternatively or additionally, based at least in part on the first similarity score and the second similarity score or the one or more similarity scores described above (e.g., and not based on the data structure), some embodiments perform video object segmentation of the video frame. In some embodiments, video object segmentation is not necessarily performed but any process that detects or identifies one or more object. For example, instead of filling out each pixel of an object with a mask value (e.g., read), which VOS functionality typically includes, some embodiments generate a bounding box over one or more objects, which indicate the positioning of the object and/or a class of the object. Any suitable indicator may be used to detect or identify an object, such as a lasso, triangle, highlighted boundaries of the object, etc.

In some embodiments, the performing of the video object segmentation of the video frame is based at least in part on the second measure of similarity, where the second measure of similarity is according to image feature similarity between respective sections. For example, if the aggregated pixel value difference for first pixels representing a first object in the first section and second pixels representing the first object in a second section is within a threshold (e.g., pixel value of 20 or less), which indicates similar color, particular embodiments, change the pixel values of both the first pixels and the second pixels to a same or similar value (e.g., a red color), which indicates the mask for video object segmentation.

In some embodiments, the data structure is a graph, and particular embodiments group, by performing a graph cut on the graph, one or more nodes, of the plurality of nodes, together based on the measure of similarity exceeding a threshold, where the performing of the video object segmentation is based at least in part on the performing of the graph cut. For example, if a first set of pixels in a first section were within an estimated distance threshold (e.g., 3) of second pixels in the second section, then particular embodiments group nodes together representing the first set of pixels and the second set of pixels and then particular embodiments responsively modify a pixel value of the first set of pixels and the second set of pixels to a same or similar mask value (e.g., a green color) so as to highlight the corresponding object(s) in the video frame.

In some embodiments, the performing of the video object segmentation of the video frame includes partitioning, via one or more indicators, one or more foreground objects from a background in the video frame. For example, in an output video frame (e.g., video frame 500 of FIG. 5A), the one or more "indicators" can be a displayed mask pixel value (e.g., green or red) that is superimposed over a foreground object, where the background contains the exact same pixel values as in the input image (e.g., the RGB video frame 202). In this way, the foreground object is separated from the background by mere superimposition of the mask pixel value over the foreground object.

In some embodiments, the process 600 (e.g., the receiving of the video frame, the receiving of the estimated motion information, the generating of the data structure, and the performing of the video object segmentation) is part of an unsupervised end-to-end pipeline that excludes learning or training a machine learning model for the video object segmentation. Examples of this are described with respect to FIG. 2. For example, even though the DINO encoder 206 is used, it is a pre-trained encoder and it is only used to derive embeddings. There is no model training or prediction needed for VOS. Although the optical flow RGB 204 includes estimated motion information, such estimation can be based on estimated distance displacement of pixels based on, for example, averaging prior displacements of the same pixels, which does not require a machine learning model. As described herein, this improves computing latency, I/O, and memory consumption.

In some embodiments, the process 600 is performed for each video frame in a video frame sequence such that video object segmentation is indicative of tracking one or more objects throughout the video frame sequence. For example, some embodiments receive a second video frame, of the plurality of video frames, where the second video frame is a next succeeding video frame relative to the video frame in the video sequence. Particular embodiments then receive second estimated motion information for a second plurality of pixels of the second video frame. Some embodiments then generate a second data structure that includes a second plurality of nodes and a second set of one or more edges. Each node, of the second plurality of nodes, represents a respective section of the second video frame. Each edge, of the first set of one or more edges, being associated with a second weight that at least partially indicates a measure of similarity between respective sections of the second video frame according to the second estimated motion information. The second estimated motion information being based at least in part on the estimated motion information. For example, if the estimation motion information was observed to be a displacement/distance of 3 in the X direction and 1 in the Y direction at the video frame, then particular embodiments estimate that the same displacement of 3 and 1 in the second video frame (or an average of the displacement of multiple previous video frames). Based at least in part on the generating of the second data structure, some embodiments perform video object segmentation of the second video frame such that an object is tracked between the video frame and the second video frame. As described above, each video frame makes of a video sequence. Accordingly, if two or more two or more video have been subject to VOS, then, from the perspective of the user, the object appears to be tracked or followed in a time sequence that corresponds to the video frame sequence timing.

Figure 7:
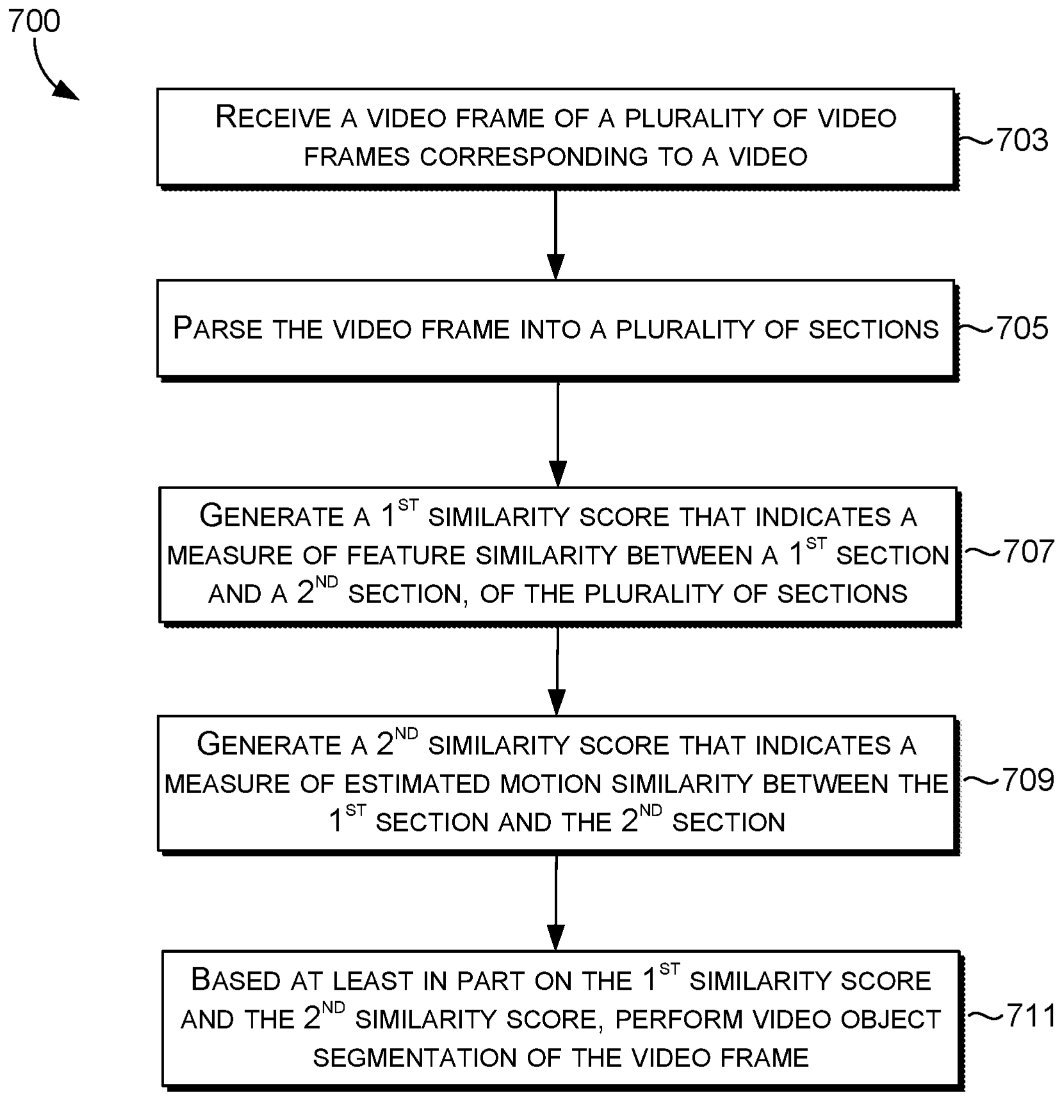
FIG. 7 is a flow diagram of an example process for performing video object segmentation, according to some embodiments.

FIG. 7 is a flow diagram of an example process 700 for performing video object segmentation, according to some embodiments. Per block 703, some embodiments receive a video frame of a plurality of video frames corresponding to a video. Per block 705, some embodiments parse the video frame into a plurality of sections. For example, referring back to FIG. 4A, the video frame 400 is parsed into the sections 400-1 through 400-6. Per block 707, some embodiments generate a first similarity score that indicates a measure of feature similarity between a first section and a second section, of the plurality of sections. For example, the measure of feature similarity can be visual pixel-level feature similarity based on pixel values being within a threshold score or distance (e.g., Euclidian distance). In other words, the actual scores themselves and the similarity can be at the pixel level so that each pixel has their own pixel similarity score. However, in some embodiments, the measure of feature similarity can be a combination of pixels of each section such that the actual scores themselves and the similarity can be at the section level, when a section includes two or more pixels. Likewise, with respect to block 709, the similarity score can be at the pixel level or combination of pixel level.

Per block 709, some embodiments generate a second similarity score that indicates a measure of estimated motion similarity between the first section and the second section. For example, optical flow similarity may be calculated, where the difference in estimated and/or actual pixel displacement for each section is directly proportional to the second similarity score—the higher the score, the more similar the estimated motion information is between sections or the less difference there is between the sections.

Per block 711, based at least in part on the first similarity score and the second similarity score, particular embodiments perform video object segmentation of the video frame. For example, for those pixels between the first section and the second section that have the same or similar scores within a threshold, particular embodiments superimpose a pixel mask over those pixels to highlight the corresponding objects so that they may be tracked in a video sequence.

Experimental Results

As described herein, particular embodiments improve the accuracy of existing VOS technologies. This section describes experimental setup and results that experimenting researchers achieved with respect to accuracy for some embodiments described herein. Before a description is given of the accuracy results in Table 1 below, the experimental setup will now be described to illustrate the datasets that were used. Three standard benchmarks for unsupervised video object segmentation were used—DAVIS16, SegTrackv2, and FBMS59. DAVIS16 (Perazzi et al. (2016) is a video dataset comprising 50 videos in total—including 30 videos for training, and 20 videos for validation. It has a total of 3455 frames captured at 24 fps. The primary moving object is annotated densely at a resolution of 480p. SegTrackv2 (Li et al (2013) is another densely annotated video dataset comprising of 14 video sequences, with a total of 1066 annotated frames. FBMS59 (Ochs et al. (2013)) consists of 59 videos—29 videos for training and 30 videos for testing. The annotations are available for every $20^{th}$ frame, with a total of 720 annotated frames. The researchers merged multiple segmentation masks into on for SegTrackv2 and FBMS59 datasets.

Table 1 below illustrates such improvement. For determining accuracy of all data sets, the experimenting researches used the standard Jaccard metric, J, which is the mean intersection-over-union (mIoU) of the predicted and the ground-truth segmentation masks. The IoU score is a value between 0 and 1. As per standard, the researchers dropped the first video frame from all the videos for evaluation on the DAVIS16 dataset and report the sequence average of the mIoU scores. For SegTrackv2 and FBMS59 datasets, the researchers reported average IoU scores over all the video frames in the data set (frame average). The hyper-parameters t and alpha were set to 0.25 and 0.7 respectively.

TABLE 1

| Method | DAVIS16 (J ↑) | STv2 (J ↑) | FBMS59 (J ↑) |
|---|---|---|---|
| SAGE (Wang et al. (2017)) | 42.6 | 57.6 | 61.2 |
| NLC (Faktor & Irani (2014)) | 55.1 | 67.2 | 51.5 |
| CUT (Keuper et al. (2015)) | 55.2 | 54.3 | 57.2 |
| FTS (Papazoglou & Ferrari | 55.8 | 47.8 | 47.7 |
| AMD (Liu et al. (2021 | 57.8 | 57.0 | 47.3 |
| MG (Yang et al. (2021a) | 68.3 | 58.6 | 53.1 |
| EM (Meunier et al. (2022)) | 69.3 | 55.5 | 57.8 |
| CIS** (Yang et al. (2019)) | 71.5 | 62.0 | 63.5 |
| ARP* (Koh & Kim (2017)) | 76.2 | 57.2 | 59.8 |
| OCLR‡ (Xie et al. (2022)) | 78.9 | 71.6 | 68.7 |
| DS† (Ye et al. (2022)) | 79.1 | 72.1 | 71.8 |
| DyStaB* (Yang et al. | 80.0 | 74.2 | 73.2 |
| Ponimatkin et al. (2023) | 80.2 | 74.9 | 70.0 |
| GWM** (Choudhury et al. | 80.7 | 78.9 | 78.4 |
| Ours | 78.03 | 76.27 | 63.69 |

Table 1 depicts the comparison between various embodiments of the present disclosure (e.g., the functionality in FIG. 2), labeled as “Ours” and the existing unsupervised VOS approaches. The learning-free pipeline based on graph-cut (i.e., “Ours”) achieves competitive results on DAVIS16 and SegTrackv2 benchmarks, within a range of ~2 mIoU with current state-of-the-art. “Ours” achieves the second-best-performance on the SegTrackv2 dataset. The methods above the dashed line are non-deep-learning based approaches. † denotes optimization per video sequence. *DyStaB utilizes supervised pre-training, ARP uses human supervision in the form of saliency maps. OCLR leverages manual annotations from large-scale Youtube-VOS data to generate synthetic data. ** indicates usage of significant post-processing techniques like multi-step flow, multi-crop ensemble, and temporal smoothing.

Exemplary Operating Environments

Figure 8:
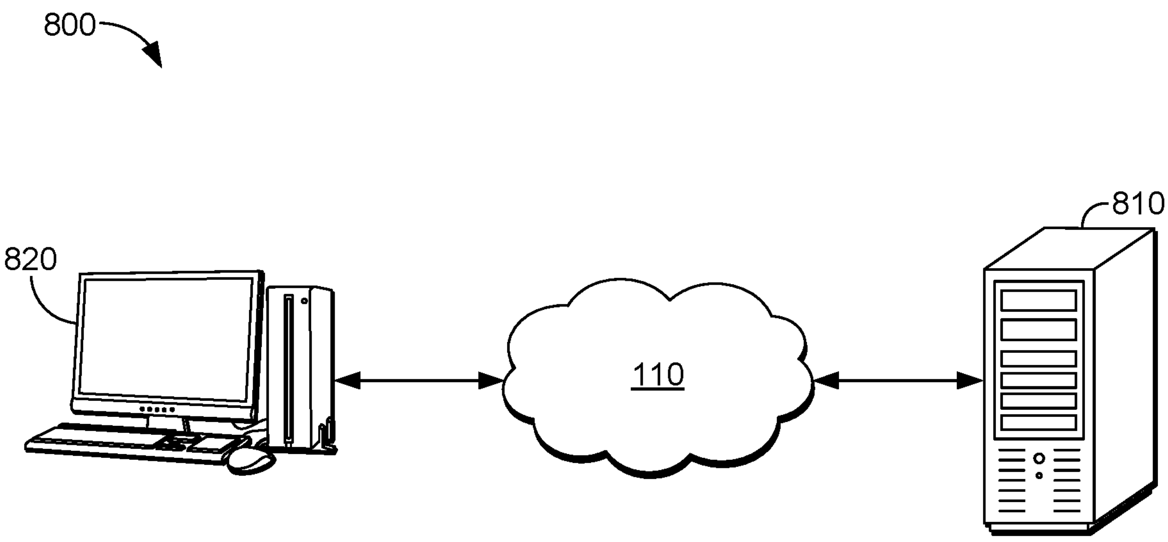
FIG. 8 is an example computer environment in which aspects of the present disclosure are employed, according to some embodiments.

Turning now to FIG. 8, a schematic depiction is provided illustrating an example computing environment 800 for recommending one or more color values for applying to an input image, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 810 that represent nodes in a cloud computing network. Various functions described herein as being performed by one or more entities may be carried out by hardware, firmware, and/or software. For instance, various functions may be carried out by a processor executing instructions stored in memory.

The environment 800 depicted in FIG. 8 includes a prediction server ("server") 810 that is in communication with a network 110. The environment 800 further includes a client device ("client") 820 that is also in communication with the network 110. Among other things, the client 820 can communicate with the server 810 via the network 110, and generate for communication, to the server 810, a request to make a detection, prediction, or classification of one or more instances of a document/image. The request can include, among other things, a request to perform video object segmentation. In various embodiments, the client 820 is embodied in a computing device, which may be referred to herein as a client device or user device, such as described with respect to the computing device 900 of FIG. 9.

In some embodiments, each component in FIG. 1 or FIG. 2 is included in the server 810 and/or the client device 820. Alternatively, in some embodiments, the components of FIG. 1 or 2 are distributed between the server 810 and client device 820.

The server 810 can receive the request communicated from the client 820, and can search for relevant data via any number of data repositories to which the server 810 can access, whether remotely or locally. A data repository can include one or more local computing devices or remote computing devices, each accessible to the server 810 directly or indirectly via network 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 810 is embodied in a computing device, such as described with respect to the computing device 900 of FIG. 9.

Figure 9:
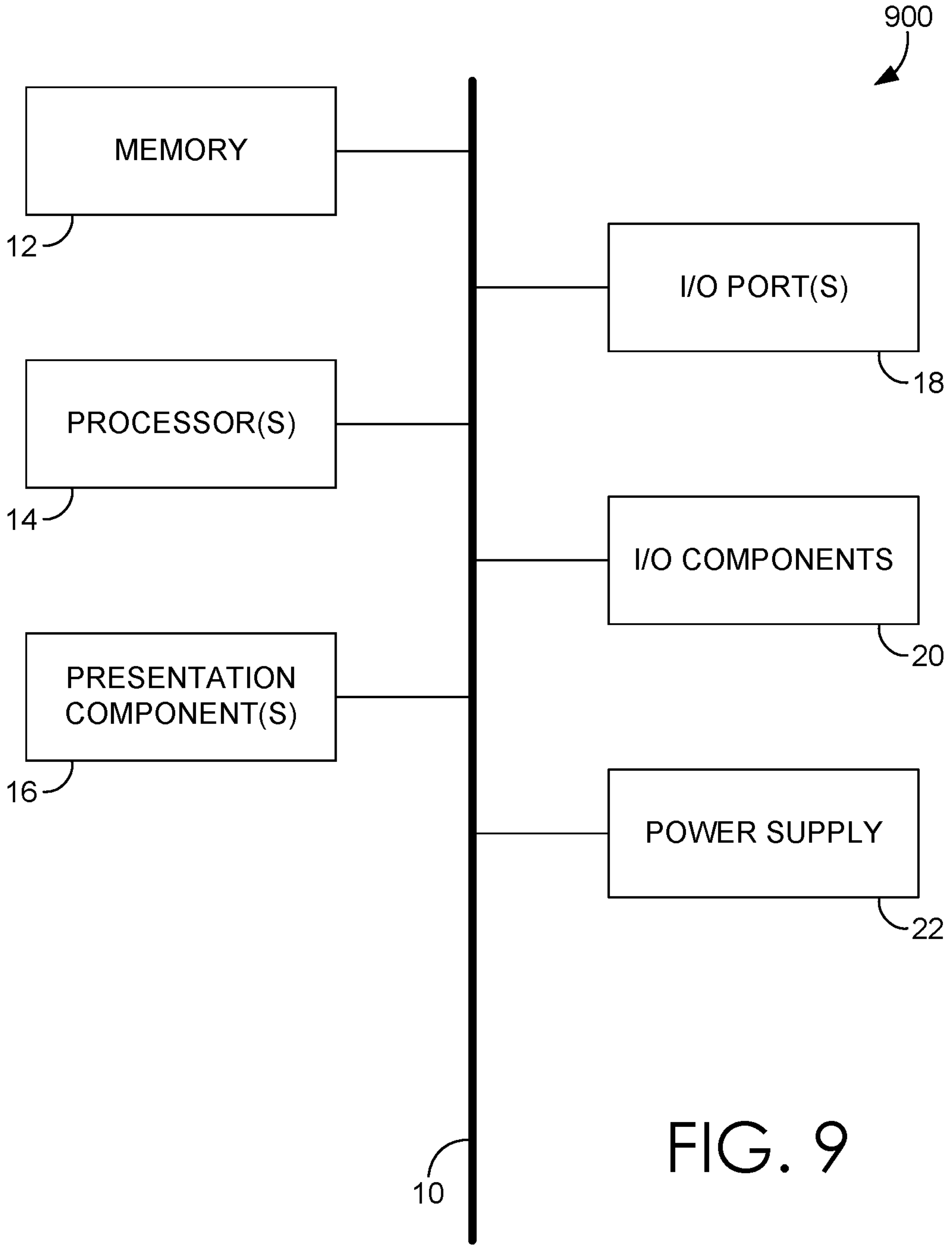
FIG. 9 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Looking now to FIG. 9, computing device 900 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 900 represents the client device 820 and/or the server 810 of FIG. 8.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 600 of FIG. 6, or any functionality described with respect to FIGS. 1 through 9.

I/O ports 18 allow computing device 900 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

at least one computer processor; and one or more computer storage media storing computer-useable instructions that, when used by the at least one computer processor, cause the at least one computer processor to perform operations comprising:

receiving a video frame, of a plurality of video frames, the plurality of video frames corresponding to a video;

accessing estimated motion information for each pixel, of a plurality of pixels, of the video frame, the estimated motion information includes information indicating a predicted displacement of each pixel from the video frame to a second video frame;

generating a data structure that includes a plurality of nodes and one or more edges, each node, of the plurality of nodes, represents a respective section of the video frame, each edge, of the one or more edges, being assigned a weight value that at least partially indicates a measure of similarity between respective sections of the video frame based at least in part on the predicted displacement of each pixel from the video frame to the second video frame; and based at least in part on the each edge being assigned the weight value that at least partially indicates a measure of similarity between respective sections of the video frame based at least in part on the predicted displacement of each pixel from the video frame to the second video frame, performing video object segmentation of the video frame.

2. The system of claim 1, wherein the at least one computer processor performs further operations comprising: in response to the receiving of the video frame and the accessing of the estimated motion information, deriving, via a pre-trained vision transformer, one or more embeddings that are one or more encoded representations of the video frame and the estimated motion information, and wherein the one or more embeddings are used as input for the generating of the data structure.

3. The system of claim 1, wherein the weight further indicates a second measure of feature similarity between respective sections of the video frame according to image feature similarity between the respective sections, and wherein performing video object segmentation of the video frame is based at least in part on the second measure of similarity.

4. The system of claim 1, wherein the data structure is a graph, and wherein the operations further comprising performing a graph cut on the graph by removing or deleting one or more edges between nodes of the plurality of nodes having weights below a threshold, wherein the weights are based at least in part on predicted displacement of pixels between the respective sections of the video frame as at least partially indicated by the estimated motion information, and wherein the performing of the video object segmentation is based at least in part on the performing of the graph cut.

5. The system of claim 1, wherein the performing of the video object segmentation of the video frame includes partitioning, via one or more indicators, one or more foreground objects from a background in the video frame.

6. The system of claim 1, wherein the receiving of the video frame, the accessing of the estimated motion information, the generating of the data structure, and the performing of the video object segmentation is a part of an unsupervised end-to-end pipeline that excludes learning or training a machine learning model for the video object segmentation.

7. The system of claim 1, wherein the operations further comprising;

receiving a second video frame, of the plurality of video frames, the second video frame being a next succeeding video frame relative to the video frame in the video;

accessing second estimated motion information for a second plurality of pixels of the second video frame;

generating a second data structure that includes a second plurality of nodes and a second set of one or more edges, each node, of the second plurality of nodes, represents a respective section of the second video frame, each edge, of the second set of one or more edges, being associated with a second weight that at least partially indicates a measure of similarity between respective sections of the second video frame according to the second estimated motion information, the second estimated motion information being based at least in part on the estimated motion information for the video frame; and based at least in part on the generating of the second data structure, performing video object segmentation of the second video frame such that an object is tracked between the video frame and the second video frame.

8. A computer-implemented method comprising:

receiving a video frame, of a plurality of video frames, the plurality of video frames corresponding to a video;

parsing the video frame into a plurality of sections;

generating a first similarity score that indicates a measure of feature similarity between a first section and a second section, of the plurality of sections;

generating a second similarity score that indicates a measure of estimated motion information similarity between the first section and the second section, the estimated motion information includes information indicating a predicted displacement of each pixel from the video frame to a second video frame; and based at least in part on weights assigned to an edge of a data structure that represent a linear combination of the first similarity score and the second similarity score, performing video object segmentation of the video frame.

9. The computer-implemented method claim 8, further comprising: in response to the receiving of the video frame and determining estimated motion information, deriving, via a pre-trained vision transformer, one or more embeddings that are one or more encoded representations of the video frame and the estimated motion information, and wherein the one or more embeddings are used as input for the generating of the first similarity score and the second similarity score.

10. The computer-implemented method of claim 8, wherein the second similarity score is generated based on estimated motion information, the estimated motion information includes optical flow information that indicates a predicted displacement of each pixel from the video frame to a second video frame, of the plurality of video frames.

11. The computer-implemented method of claim 8, further comprising generating a graph that includes a plurality of nodes and one or more edges, each node, of the plurality of nodes, represents a respective section of the video frame, each edge, of the one or more edges, being associated with a weight that at least partially indicates the first similarity score and the second similarity score.

12. The computer-implemented method of claim 11, further comprising grouping, by performing a graph cut on the graph, one or more nodes, of the plurality of nodes, together based on the weight exceeding a threshold, and wherein the performing of the video object segmentation is based at least in part on the performing of the graph cut.

13. The computer-implemented method of claim 8, wherein the performing of the video object segmentation of the video frame includes partitioning, via one or more indicators, one or more foreground objects from a background in the video frame.

14. The computer-implemented method of claim 8, wherein the receiving of the video frame, the parsing, the generating of the first similarity score, and the generating of second similarity score is a part of an unsupervised end-to-end pipeline that excludes learning or training a machine learning model for the video object segmentation.

15. The computer-implemented method of claim 8, further comprising;

receiving a second video frame, of the plurality of video frames, the second video frame being a next succeeding video frame relative to the video frame in the video;

parsing the second video frame into a second plurality of sections;

generating a third similarity score that indicates a measure of feature similarity between a first section and a second section of the second plurality of sections;

generating a fourth similarity score that indicates a second measure of estimated motion information similarity between the first section and the second section of the second plurality of sections, the second measure of estimated motion being based at least in part on the measure of estimated motion between the first section and the second section of the plurality of sections of the video frame;

based at least in part on the third similarity score and the fourth similarity score, performing video object segmentation of the second video frame such that an object is tracked between the video frame and the second video frame.

16. A computerized system, the system comprising:

an embedding means for receiving a video frame, of a plurality of video frames, the plurality of video frames corresponding to a video;

a video frame patch means for parsing the video frame into a plurality of sections;

an estimated motion means for receiving or determining motion information for a plurality of pixels of the video frame, the estimated motion information includes information indicating a predicted displacement of each pixel from the video frame to a second video frame;

wherein the embedding means is further for deriving one or more embeddings that are one or more encoded representations of the video frame and the predicted displacement of each pixel from the video frame to the second video frame;

a similarity score means for generating one or more similarity scores that indicates at least one of a measure of feature similarity between a first section and a second section, of the plurality of sections, and a measure of motion information similarity between the first section and the second section based at least in part on the predicted displacement of each pixel from the video frame to the second video frame; and a VOS means for performing video object segmentation of the video frame based at least in part on the generating of the one or more similarity scores.

17. The computerized system of claim 16, further comprising a graph generator means for generating a graph that includes a plurality of nodes and one or more edges, each node, of the plurality of nodes, represents a respective section of the video frame, each edge, of the one or more edges, being associated with a weight that at least partially indicates the one or more similarity scores.

18. The computerized system of claim 17, further comprising a graph cut means 118 for grouping, by performing a graph cut on the graph, one or more nodes, of the plurality of nodes, together based on the weight exceeding a threshold, and wherein the performing of the video object segmentation is based at least in part on the performing of the graph cut.

19. The computerized system of claim 16, wherein the performing of the video object segmentation of the video frame includes partitioning, via one or more indicators, one or more foreground objects from a background in the video frame.

* * * * *